United States Patent [19]
Cwik et al.

[11] Patent Number: 5,944,363
[45] Date of Patent: Aug. 31, 1999

[54] FLEXIBLE CONNECTOR SYSTEMS

[75] Inventors: Scott Cwik, Carol Stream; Roy S. Clavey, Downers Grove; Matthew T. O'Sullivan, Rockford, all of Ill.

[73] Assignee: Senior Engineering Investments AG, Switzerland

[21] Appl. No.: 08/779,865

[22] Filed: Jan. 6, 1997

[51] Int. Cl.⁶ .................................................. F16L 27/12
[52] U.S. Cl. ..................... 285/226; 285/300; 29/401.1; 29/890.52
[58] Field of Search ...................... 285/300, 299, 285/298, 226, 49; 29/401.1, 402.3, 525.11, 890.052

[56] References Cited

U.S. PATENT DOCUMENTS

| | | | |
|---|---|---|---|
| 1,914,741 | 6/1933 | Gysling | 285/299 X |
| 1,923,124 | 8/1933 | Stanley | 285/90 |
| 2,862,729 | 12/1958 | Bredtschneider | 285/226 X |
| 3,112,115 | 11/1963 | Willis et al. | 285/226 |
| 4,209,177 | 6/1980 | Hall | 277/101 |
| 4,516,782 | 5/1985 | Bendl | 277/100 |
| 4,583,768 | 4/1986 | Aoki et al. | 285/41 |
| 4,718,156 | 1/1988 | Cole | 29/401.1 X |
| 4,863,200 | 9/1989 | Brandener | 285/234 |
| 4,871,181 | 10/1989 | Usher et al. | 277/229 |
| 4,893,847 | 1/1990 | Hess | 285/226 |
| 4,911,482 | 3/1990 | Doat | 285/226 |
| 4,928,998 | 5/1990 | Brandener | 285/49 |
| 5,090,746 | 2/1992 | Holzhausen | 285/226 |
| 5,203,593 | 4/1993 | Brandener | 285/49 |
| 5,239,956 | 8/1993 | Keelan et al. | 29/890.052 |
| 5,511,828 | 4/1996 | Kurek et al. | 285/49 |
| 5,639,127 | 6/1997 | Davey | 285/300 X |

FOREIGN PATENT DOCUMENTS

| | | | |
|---|---|---|---|
| 0 108 829 | 5/1984 | European Pat. Off. | 51/2 |
| 0 399 880 | 11/1990 | European Pat. Off. | F01N 7/18 |
| 0 718 537 | 6/1996 | European Pat. Off. | 27/10 |
| 2 598 776 | 11/1987 | France . | |
| 2 644 552 | 9/1990 | France . | |
| 29 12 347 | 10/1980 | Germany | 39/4 |
| 1101074 | 1/1968 | United Kingdom . | |
| WP 95/21320 | 8/1995 | WIPO . | |

*Primary Examiner*—Lynne Reichard
*Assistant Examiner*—Greg Binda
*Attorney, Agent, or Firm*—Dick and Harris

[57] ABSTRACT

Flexible connector systems are provided for decoupling vibrations between two components of an exhaust system of a vehicle, for example an exhaust manifold and an exhaust down pipe. The flexible connector systems are configured for providing sealed, substantially leak-proof connections which are capable of accommodating axial elongation and contraction, as well as pivoting movements of one component, relative to another component. The flexible connector systems include mating structures which are configured to mate with existing manifold outlet formations, with little or no modification of the exhaust manifold configuration. Ball joint structures and/or resilient mounting materials are used for accommodating pivoting movements. Bellows are provided for accommodating elongation and contraction, while providing sealing enclosure of pipe elements transporting the exhaust gases.

35 Claims, 12 Drawing Sheets

FLEXIBLE CONNECTOR SYSTEMS

BACKGROUND OF THE INVENTION

1. The Field of the Invention

The present invention relates to connectors for joining components in fluid transmission systems, such as exhaust systems for internal combustion engines, wherein the connector will be exposed to axial, transverse and bending vibrations and forces. In particular, the present invention relates to connectors for joining pipes to one another or to other structures in exhaust systems for vehicles.

2. The Prior Art

It is well known that, in vehicle exhaust systems, the internal combustion (i.e., engines) produces significant amounts of vibration in the exhaust system. Operation of the motors at continuous speeds for prolonged periods of time can, especially, produce what are known as harmonic vibrations which can cause significant deflections in extended lengths of exhaust pipe and at locations where such pipes are mounted to structures such as brackets, engine manifolds and the like. Repeated deflections and vibrations along the exhaust pipe system, can, in turn, cause the structures to weaken with time and ultimately fail. Further, such harmonic vibrations can also be transmitted through the exhaust pipes to the mountings of the pipes, promoting the loosening of the mountings which can result in the displacement of one or more components of the exhaust system, with the potential for both personal injury and equipment damage.

In addition to the vibrations caused by the operation of the motor of a vehicle, an exhaust system is also subjected to various tension, compression and bending forces which also arise during the operation of the vehicle. While individual exhaust system components could be made stronger and more massive to resist failure by fatigue, such constructions would be undesirable due to weight considerations. Further, by making individual elements stiffer, the vibrations are merely transmitted throughout the exhaust system to the mountings or other components and are not reduced or eliminated. Accordingly, it is desirable to isolate the exhaust system, or at least components of the system, from such vibration and forces.

It is known that if the pipes of an exhaust system or other components, are divided and separated by non-rigid connections, rather than being constructed as continuous extended lengths and/or rigid connections, the development of harmonic vibrations from the motor is precluded or reduced. Such non-rigid connections can be advantageously employed to absorb other tension, compression and bending forces, apart from and in addition to the motor vibration.

It is therefore desirable to provide a connector for joining a length of exhaust pipe to another pipe or to a mounting, such as an engine manifold, which connector joins the components in a non-rigid fashion and is capable of absorbing tension, compression and bending forces, as well as vibrational forces, without transmitting them from one exhaust system component to another.

One method for providing a connection which is non-rigid and capable of precluding or reducing transmission of vibrations, between an engine component and engine component such as an exhaust manifold, and the pipes of an exhaust system is to provide a ball joint structure at the point of connection of the pipe to the manifold. Typically, such prior art ball joint connections utilize a concave socket structure surrounding the aperture in the exhaust manifold. A fitting is then provided at the end of the exhaust pipe which has a corresponding spherical or ball type configuration so that pivotal movement is enabled between the pipe end and the manifold. In order to attempt to maintain tight contact between the pipe end and the manifold, typically the joint is provided with a preload in the form of a spring or springs or other clamping members which exert a compressive force tending to hold the pipe end spherical portions in relatively tight contact with socket portions of the manifold.

However, the exhaust pipes are often subjected to tension forces which may result from forces exerted to the pipe or to the engine itself which may tend to pull apart the ball and socket portions of the joint. The resulting gap which may occur between the ball and socket portions permits the escape of exhaust gases from the ball joint. In addition, in the ordinary course of operation during which time the joint is continuously subjected to high frequency, low amplitude vibration simply from the operation of the engine, the mere act of pivoting movement by the pipe and relative to the manifold means that a small, but nevertheless finite clearance exists between the ball and socket portions of the connection, likewise permitting the escape of exhaust gases. Typically, such ball and socket joints have not been provided with further means for assuring the prevention of the escape of exhaust gases.

Increasing governmental pollution regulations, however, have placed greater importance on the further reduction of vehicle emissions, including such unintentional exhaust emissions as those described. While some attempts have been made to provide for sealed ball joint connector constructions, such as those illustrated in such references as Hess, U.S. Pat. No. 4,893,847, Doat, U.S. Pat. No. 4,911,482, French Application No. 2 644 552, British Patent No. 1,101,074 and European Patent Application No. EP 0 718 537, such prior art constructions typically are either configured solely for connecting abutting simple cylindrical pipe ends, and are not suitable for direct connection of a pipe to an exhaust manifold, or alternatively have been designed to mate with specific existing manifold structures, and may not be compatible with different kinds of existing exhaust manifolds, or exhaust manifolds the configurations of which have been modified. In addition, such prior art sealed flexible coupling structures are often particularly difficult to install, repair, or otherwise maintain. Accordingly, it would be desirable to provide a flexible connector system for use in fluid transmission systems, such as the exhaust systems of vehicle having internal combustion engines, which is not only capable of precluding the transmission of vibrations from the engine along the exhaust system, but is also capable of providing enhanced protection against the undesired escape of exhaust gases.

It would also be desirable to provide such a sealed flexible connector system for exhaust systems, which is capable of being integrated with existing or only slightly modified manifold structures and configurations, from that of non-sealed systems.

It would be still further desirable to provide such a flexible connector system which is more easily installed and/or maintained.

These and other objects of the present invention will become apparent in light of the present specification including claims and drawings.

SUMMARY OF THE INVENTION

The present invention comprises, in part, a flexible connector system in combination with an exhaust manifold for an internal combustion engine. The system comprises an engine manifold, having at least one outlet aperture, and a component connection structure; a downstream exhaust system component; and a flexible connector connecting the exhaust manifold with the downstream exhaust system component.

The flexible connector includes an intermediate pipe member, having a first end and a second end. The intermediate pipe member is operably configured for attachment, at one of the first and second ends, to the downstream exhaust system component. The intermediate pipe member is further configured to be alignable with and positionable substantially adjacent to at least one outlet aperture of the exhaust manifold, for the transportation of fluid from at least one outlet aperture to the downstream exhaust system component.

A flexible tubular bellows member has a first end and a second end, disposed about the intermediate pipe member and affixable, at least indirectly, at one of its first and second ends, to the downstream exhaust system component, with a substantially leakproof fluid-tight seal. A first interface member is operably configured for engagement with a portion of the component connection structure of the exhaust manifold, and connected with a substantially leakproof fluid-tight seal between the first interface member and the portion of the component connection structure of the exhaust manifold, and connected with a substantially leakproof fluid-tight seal between the first interface member and one end of the bellows member. At least one engagement member is configured for operable association between the intermediate pipe member and at least one of the second interface member and the exhaust manifold. accommodating relative angular movement between at least one of the exhaust manifold, the intermediate pipe member and the first interface member; and one of the first and second interface members, respectively. At least one preloading member operably configured for maintaining at least one engagement member in biased prompted engagement with the component connection structure of the exhaust manifold.

The component connection structure of the exhaust manifold preferably includes a substantially flat attachment surface, which has been formed by removing from an existing exhaust manifold structure, outwardly projecting structures from the exhaust manifold.

The component connection structure of the exhaust manifold alternatively preferably includes a substantially flat attachment surface, which has been formed by filling the corresponding portions of the existing form for fabricating the exhaust manifold, from which any outwardly projecting structures which would otherwise project from the attachment surface, are produced, to preclude formation of such projecting structures, upon the initial fabrication of the exhaust manifold.

The present invention also comprises, in part, a flexible connector apparatus for joining components in a fluid transmission system, such as an exhaust system for an internal combustion engine powered vehicle, for example the joining of an exhaust manifold, having at least one outlet aperture, and a component connection structure, to a downstream exhaust system component, for providing a substantially sealed, leakproof connection for substantially precluding the escape into ambient atmosphere of exhaust gases while accommodating laterally directed and bending forces acting upon the joined components, towards substantially precluding the transmission from one component to another of such laterally directed and bending forces.

The flexible connector apparatus comprises an intermediate pipe member, having a first end and a second end, the intermediate pipe member being operably configured for attachment, at one of the first and second ends, to a downstream exhaust system component, the intermediate pipe member further being configured to be alignable with and positionable substantially adjacent to an at least one outlet aperture of an exhaust manifold, for the transportation of fluid from the at least one outlet aperture to a downstream exhaust system component.

A flexible tubular bellows member, having a first end and a second end, is disposed about the intermediate pipe member and affixable, at least indirectly, at one of the first and second ends, to a downstream exhaust system component, with a substantially leakproof fluid-tight seal.

A first interface member is operably configured for engagement with a portion of the component connection structure of an exhaust manifold, for establishing a substantially leakproof fluid-tight seal between the first interface member and the portion of the component connection structure of an exhaust manifold, and for establishing a substantially leakproof fluid-tight seal between the first interface member and one end of the bellows member. At least one engagement member is configured for operable association with the intermediate pipe member and an exhaust manifold, for accommodating relative angular movement between the intermediate pipe member and an exhaust manifold. At least one preloading member is operably configured for maintaining the at least one engagement member in biased prompted engagement with the component connection structure of an exhaust manifold.

Preferably, the engagement member comprises a fitting member, operably disposed on one end of the intermediate pipe member, and operably configured to substantially conform to and mate with a socket region operably disposed in one of a component connection structure of an exhaust manifold and a second interface member operably associated with the flexible tubular bellows member, for enabling substantially omni-directional pivoting of the intermediate pipe member relative to one of the exhaust pipe manifold and the second interface member.

The fitting member comprises an annular ring member fabricated from metal mesh material, and having a three-dimensionally curved outer surface, preferably with an anti-friction powder material, impregnated into the interstices of the annular ring member.

The interface member comprises a plate member, operably configured to be affixed, in a sealing, fluid-tight manner, to a component connection structure of an exhaust manifold, the plate member being further operably configured to be affixed to another of the first and second ends of the flexible tubular bellows member. Preferably, the plate member is substantially planar in configuration. Alternatively, the plate member is substantially cup-shaped in configuration.

In one embodiment of the invention, the flexible connector apparatus is configured for cooperation with a exhaust manifold having a component connection structure having a socket region therewithin, wherein the fitting member is operably disposed at the end of the intermediate pipe, opposite the end thereof whereat the bellows member is at least indirectly affixed.

In one embodiment of the invention, the plate member is configured to be operably disposed at a position axially downstream of the fitting member, and in sealing affixation to a exhaust manifold and to an end of the bellows member, opposite the end thereof which is at least indirectly affixed to the intermediate pipe member.

The intermediate pipe member is at least indirectly affixable at one end to the component connection structure of an exhaust manifold, such that the fitting member is received on an end of the intermediate pipe member, opposite to the end which is at least indirectly affixable to the exhaust manifold, and wherein the second interface member has a socket region therewithin. The end of the bellows member which is at least indirectly affixable to a downstream exhaust system component is directly affixed, in a sealing, leakproof manner, to the second interface member, which is, in turn, substantially directly affixable to a downstream exhaust system component.

In an embodiment, a socket region is disposed within the second interface member, for cooperative engagement with the fitting member.

The bellows member is affixed at its ends in a sealing, fluid-tight manner, to the first and second interface members.

In another embodiment, the intermediate pipe member is formed as a contiguous part of the component connection structure of the exhaust manifold, such that the fitting member is received on a projecting end of the component connection structure, and wherein the second interface member has a socket region therewithin. The end of the bellows member which is at least indirectly affixable to a downstream exhaust system component is directly affixed, in a sealing, leakproof manner, to the second interface member, which is, in turn, substantially directly affixable to a downstream exhaust system component.

A socket region is disposed within the second interface member, for cooperative engagement with the fitting member. The bellows member is affixed at its ends in a sealing, fluid-tight manner, to the first and second interface members. The at least one preloading member comprises at least one fastener member, operably configured for affixing the first interface member to a component connection structure of an exhaust manifold; and at least one biasing member, operably associated with the at least one fastener member and the second interface member, for prompting the second interface member axially toward the first interface member.

Alternatively, a second interface member is configured for operable association with an end of the bellows member opposite the end which is sealed to the first interface member. The second interface member is further operably associated with the first interface member, for angular movement relative thereto.

Preferably, the engagement member comprises a resilient spacer member axially disposed between the first and second interface members and in abutting contact therewith. The spacer member comprises a metal mesh ring.

Preferably, in another embodiment, at least one preloading member comprises at least one fastener member, operably configured for affixing the first interface member to a component connection structure of an exhaust manifold; with at least one biasing member, operably associated with the at least one fastener member and the second interface member, for prompting the second interface member axially toward the first interface member, and compressing the spacer member therebetween.

The at least one engagement member comprises a region of the intermediate pipe member, operably configured for enabling enhanced flexibility of the intermediate pipe member, toward accommodating relative angular movement between an exhaust manifold and other regions of the intermediate pipe member. The region of the intermediate pipe member which is operably configured for enabling enhanced flexibility comprises a region wherein portions of pipe material have been removed, in arcuate segments along a circumferential direction relative to a longitudinal axis of the intermediate pipe member.

The region of the intermediate pipe member which is operably configured for enabling enhanced flexibility comprises a region wherein portions of pipe material have been removed, forming first and second intermediate pipe members, having alternating interlaced axially overlapping tab members emanating therefrom; and at least one binding member, operably encircling the alternating interlaced axially overlapping tab members for flexibly binding the first and second intermediate pipe members to one another.

The invention also comprises a method for providing a flexible connector for joining components in a fluid transmission system, such as an exhaust system for an internal combustion engine powered vehicle, for example joining of an exhaust manifold, having at least one outlet aperture, and a component connection structure, to a downstream exhaust system component, for providing a substantially sealed, leakproof connection for substantially precluding the escape into ambient atmosphere of exhaust gases while accommodating laterally directed and bending forces acting upon the joined components, towards substantially precluding the transmission from one component to another of such laterally directed and bending forces.

The method for providing a flexible connector comprises the steps of:

forming an intermediate pipe member, having a first end and a second end, configuring the intermediate pipe member for attachment, at one of the first and second ends, to a downstream exhaust system component, further configuring the intermediate pipe member to be alignable with and positionable substantially adjacent to an at least one outlet aperture of an exhaust manifold, for the transportation of fluid from the at least one outlet aperture to a downstream exhaust system component;

forming a flexible tubular bellows member, having a first end and a second end, and disposing the bellows member about the intermediate pipe member and affixable, at least indirectly, at one of the first and second ends, to a downstream exhaust system component, with a substantially leakproof fluid-tight seal;

a first interface member, operably configured for engagement with a portion of the component connection structure of an exhaust manifold, for establishing a substantially leakproof fluid-tight seal between the first interface member and the portion of the component connection structure of an exhaust manifold, and for establishing a substantially leakproof fluid-tight seal between the first interface member and one end of the bellows member;

providing at least one engagement member, configured for operable association with the intermediate pipe member and an exhaust manifold, for accommodating relative angular movement between the intermediate pipe member and an exhaust manifold; and providing at least one preloading member operably configured for maintaining the at least one engagement member in biased prompted engagement with the component connection structure of an exhaust manifold.

The method further comprises the steps of:

providing a component connection structure on a exhaust manifold, having a substantially planar engagement surface by performing one of the following steps:

removing any projecting component connection structures, if present, from the exhaust manifold and precluding formation of any projecting component connection structures on the exhaust manifold.

The step of precluding formation of any projecting component connection structures on the exhaust manifold further comprises the step of filling in portions of a mold or die for a exhaust manifold corresponding to projecting component connection structures.

The invention also comprises method for converting an exhaust system for an internal combustion engine, which exhaust system includes an exhaust manifold configured for use with a non-sealed connector for coupling the exhaust manifold to a downstream exhaust system component, to a sealed, flexible exhaust system, the method comprising the steps of:

providing a component connection structure on a exhaust manifold, having a substantially planar engagement surface by performing one of the following steps:

removing any projecting component connection structures, if present, from the exhaust manifold;

alternatively, precluding formation of any projecting component connection structures on the exhaust manifold;

affixing a flexible connector apparatus to the exhaust manifold in a sealed, flexible connection thereto.

The step of precluding formation of any projecting component connection structures on the exhaust manifold further comprises the step of filling in portions of a mold or die for a exhaust manifold corresponding to projecting component connection structures.

BEST MODE FOR CARRYING OUT THE INVENTION

Figure 1:
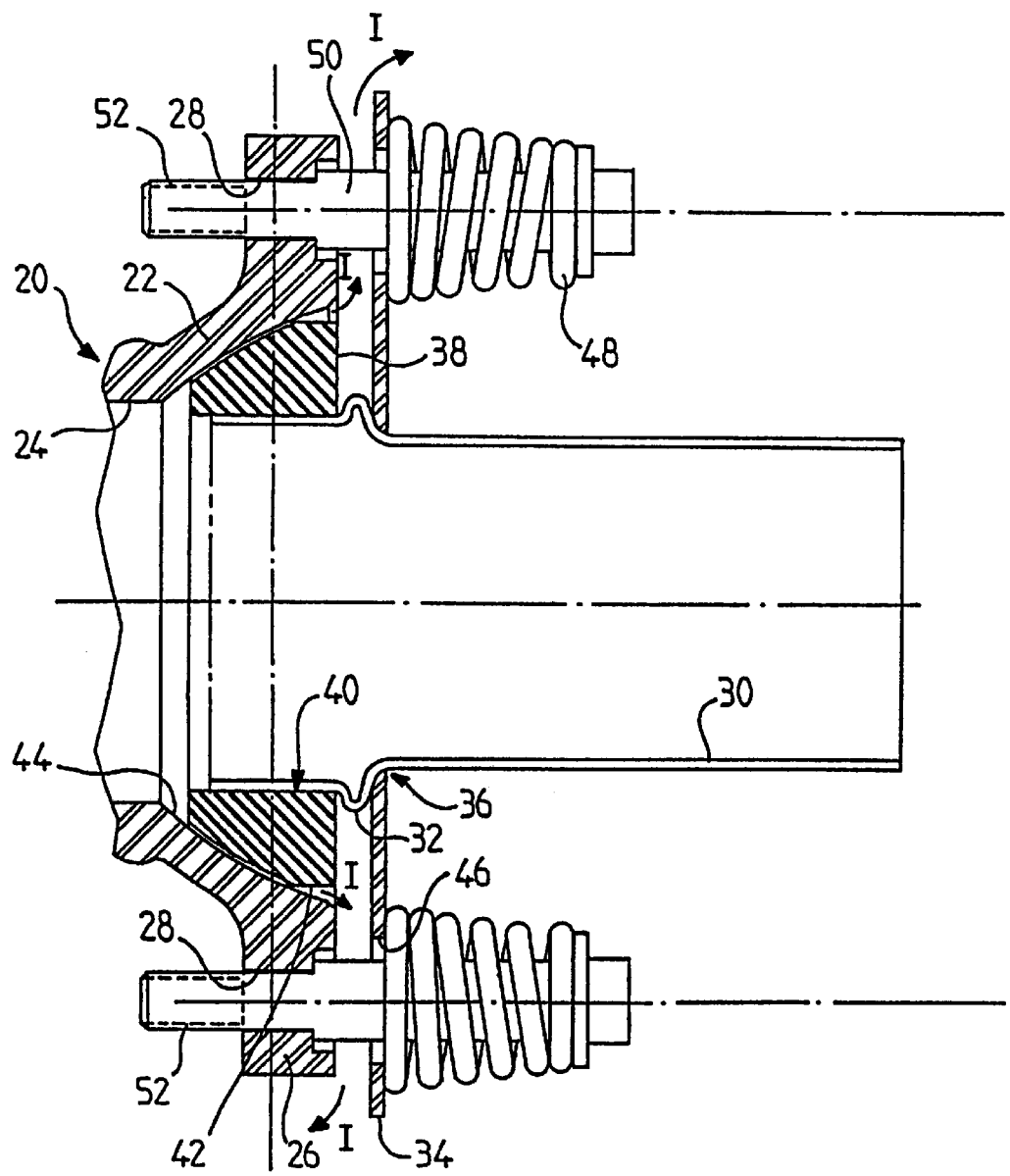
FIG. 1 is a side elevation in section of a prior art pipe connector configuration.

While this invention is susceptible of embodiment in many different forms there is shown in the drawings and will be described in detail herein several specific embodiments, with the understanding that the present disclosure is to be considered as an exemplification of the principles of the invention and is not intended to limit the invention to the embodiments illustrated.

The manifold structures of many existing internal combustion engine powered vehicles are provided with connections to their respective exhaust pipe structures, which, while configured to absorb vibrations and movement, to prevent propagation of the vibrations along the exhaust pipe structure, have not previously been configured to prevent the occasional leakage of exhaust gases from the region of connection of the manifold to the exhaust pipe. However, in view of environmental regulatory changes, such incidental air pollution can no longer be tolerated. The present invention is directed to flexible connector systems which address such incidental or secondary vehicle exhaust pollution.

While, in the illustrations of both prior art connector systems and in the illustrations of the several embodiments of the present invention, a single exhaust manifold outlet with its surrounding structures is shown, as might be the case in some applications, it is understood that the principles of the present invention can be applied, without departing from the scope of the present invention, to manifold structures having a plurality of outlets. Accordingly, illustration of such multiple outlet manifold structures has been omitted as being unnecessary for a complete understanding of the principles of the present invention.

In addition, the term "exhaust manifold" is intended, for the purposes of this application, to indicate as well any exhaust system component to which the flexible coupler apparatus of the present invention could advantageously be attached.

FIG. 1 illustrates a conventional flexible connector construction for internal combustion engine vehicles. A portion of a vehicle manifold 20 includes a socket region 22 surrounding an aperture 24. A flange 26 surrounding the socket region 22 is provided with fastener holes 28 which typically are positioned at at least two circumferentially spaced positions around the socket region 22. In the prior art construction of FIG. 1, two such fastener holes 28 are shown, spaced 180° apart. A portion of exhaust pipe 30 is provided with a radially projecting ridge 32. Plate 34 surrounds pipe 30 on the "downstream" side of ridge 32. Plate 34 has an aperture 36 which preferably has a diameter which is only slightly greater than the diameter of pipe 30 downstream of ridge 32, and which is substantially less than the greatest diameter of ridge 32. The portion of pipe 30 which is upstream from ridge 32 may have a diameter which is greater, lesser, or the same as the diameter downstream from ridge 32.

Fitted onto the upstream end of pipe 30 is a fitting 38 which has a substantially cylindrical central bore 40, and an outer surface 42 which is configured to substantially correspond to the inner surface 44 of socket region 22. Fitting 38 may be force-fitted onto the end of pipe 30. Alternatively, fitting 38 may be substantially free to move along the upstream end of pipe 30 without constraint. In such instances, the upstream end of pipe 30 typically will be provided with sufficient length such that even at an extreme extension of the flexible connector, fitting 38 would not separate completely from pipe 30. Outer surface 42 of fitting 38 typically does not precisely conform to the contour of inner surface 44. Fitting 38 is typically fabricated from compressed steel mesh material. The interstices of the mesh is usually impregnated with a powder material, which may be a combination of vermiculite and graphite. Such fittings are commercially available and can be obtained from firms such as ACS Industries, Inc., of Woonsocket, R.I.

Plate 34 is provided with apertures 46 which are positioned to be aligned with fastener holes 28 of flange 26. Coil springs 48 are fitted onto bolts 50, and bolts 50 are subsequently passed through apertures 46 and into fastener holes 28. In some constructions, the internal surfaces of fastener holes 28 are smooth, in which case, bolts 50 are configured to pass through fastener holes 28, and the threaded ends 52 of bolts 50 are captured by appropriate nuts or other fastening devices (not shown). In other constructions, fastener holes 28 may be internally threaded, in which case the threaded ends of bolts 50 are sized and threaded to engage the internal threads of fastener holes 28. In either configuration, bolts 50 are affixed such that coil springs 48 are placed under a static preload on the order of 50–150 pounds. Such a preload tends to prompt fitting 38 into socket region 22, during operation of the vehicle. The ball and socket interaction of fitting 38 and socket region 22 permits pipe 30 to pivot relative to manifold 20, thus accommodating movements which may be prompted by the vibration of the engine or movement of the exhaust pipe system itself.

However, it has been found that during operation of a vehicle, the frequency and magnitude of the vibrations encountered by such prior art flexible connector systems prevents a perfect seal from forming between the fitting 38 and the inner surface 44 of socket region 22. The pivoting movements permit gases to escape from the joint to the atmosphere. In cases of extreme axial pull on the joint, the springs 48 can be compressed, even to the point of enabling or causing lift-off of the fitting 38 from the inner surface 44 of socket region 22. Fitting 38 is not typically configured to be a non-porous sealing member. As a result of the small clearance which always exists between fitting 38 and inner surface 44 (especially during pivoting movement or lift-off of fitting 38 from inner surface 44), gases can escape between fitting 38 and inner surface 44 and leave the connection region between flange 26 and plate 34, as indicated by the arrows I in FIG. 1.

Figure 2:
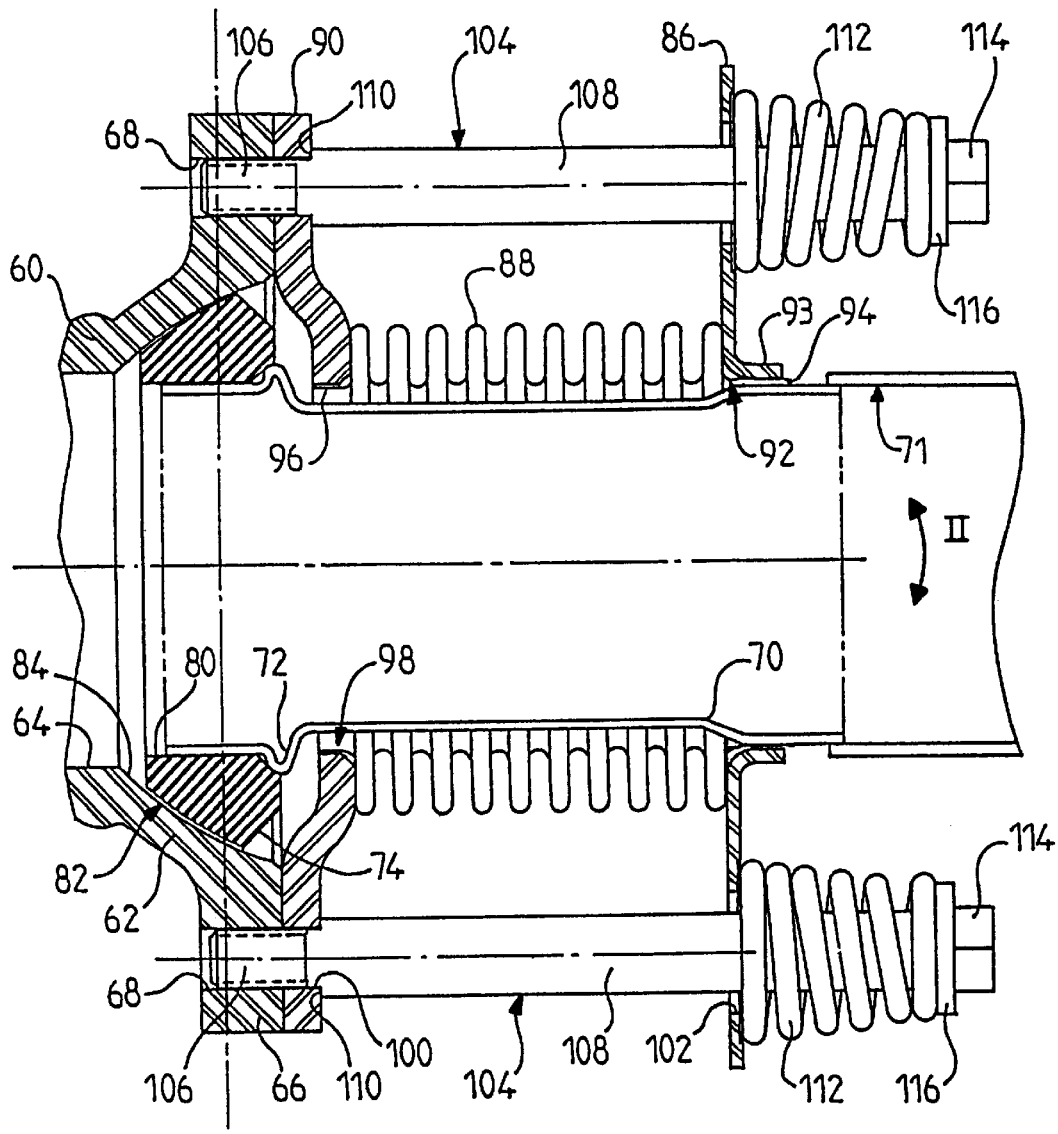
FIG. 2 is a side elevation, in section, of a flexible connector system, according to one embodiment of the present invention.
Figure 4:
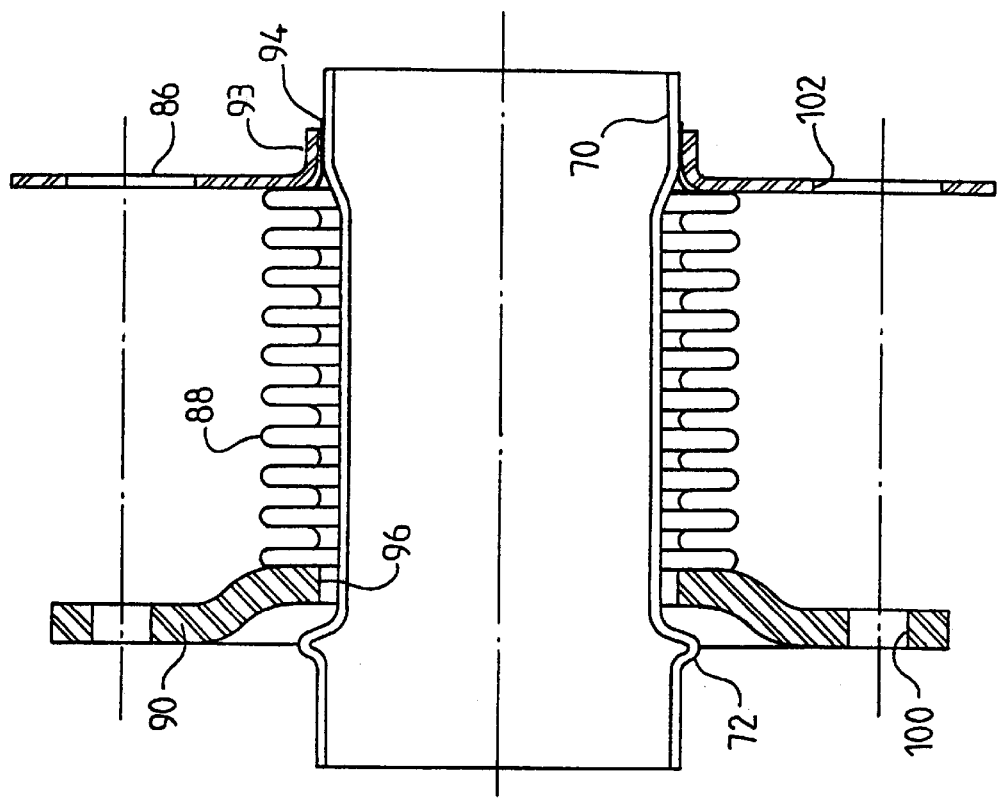
FIG. 4 is a side elevation, in section, of the pipe, plate and bellows components of the flexible connector system of FIG. 2.
Figure 3:
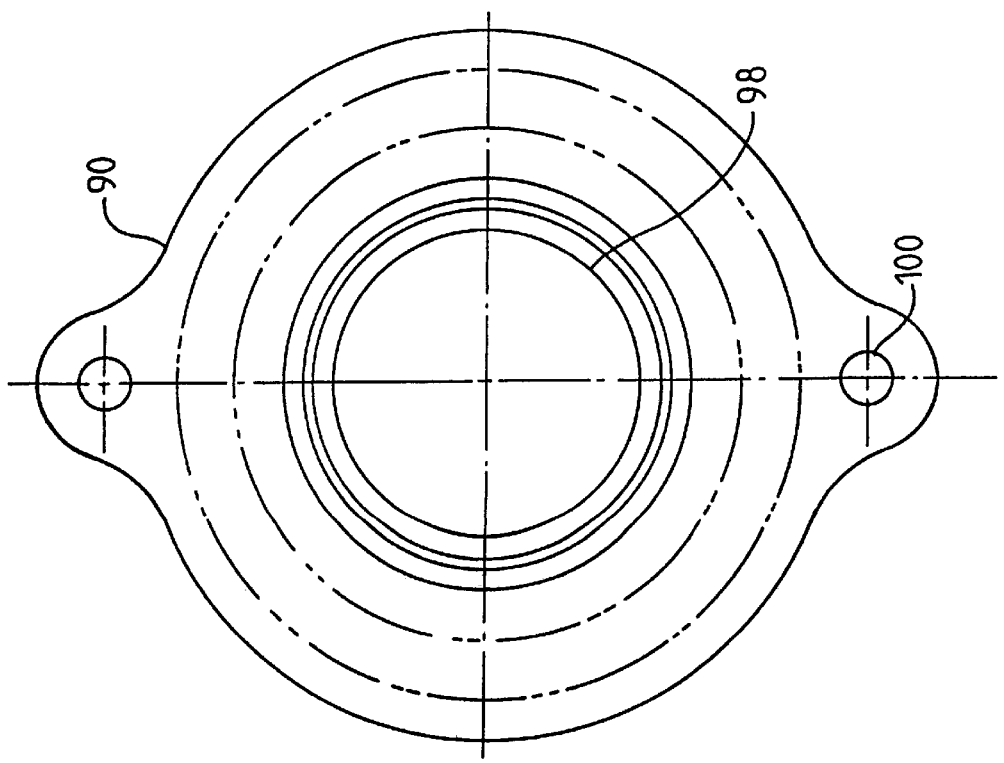
FIG. 3 is an end elevation of a plate used in the flexible connector system of FIG. 2.

FIGS. 2–4 illustrate a flexible connector system according to one embodiment of the present invention. An existing vehicle engine manifold 60, which may have substantially the same configuration manifold 20 in the prior art illustration of FIG. 1, includes aperture 64, and a component connection structure in the form of socket region 62 and flange 66 with fastener holes 68, which typically are spaced apart 180° around aperture 64.

Pipe 70 (which may be a portion of the actual exhaust pipe, or as illustrated, may be a short pipe section which is, in turn, to be connected downstream to a further exhaust pipe member 71, shown in FIG. 2 but omitted from the remaining Figures for simplicity of illustration) includes annular ridge 72. "Upstream" of ridge 72, a fitting 74 is provided and received on the end of pipe 70, in a manner similar to that described with respect to pipe 30, ridge 32 and fitting 38 of the prior art construction of FIG. 1. Fitting 74 likewise preferably is the same fitting as fitting 38, fabricated as a ring of compressed metal mesh material, which has been impregnated with a powder mixture of vermiculite and graphite (for facilitating the prevention of squeaking, during pivoting movements). Other "squeak" dampening material (Inconel, etc.) could be used, to substitute for steel mesh. Again, fitting 74 may be either force- or slip-fitting onto the end of pipe 70. Fitting 74 also preferably has a bore 80 and an outer surface 82 which generally conforms to the inner surface 84 of socket region 62 of manifold 60.

To the end of pipe 70 is affixed a connector structure including plate 86, bellows member 88 and plate 90. Preferably, plate 86 is provided with a central aperture 92 and a cylindrical flange 93. Bellows 88 is provided with substantially cylindrical ends 94, 96. Plate 90 is provided with a central aperture 98. Bellows end 94 preferably has an inner diameter which is only slightly greater than the outer diameter of pipe 70, but an outer diameter which is only slightly less than the inner diameter of cylindrical flange 93. Preferably, flange 93 of plate 86 and end 94 of bellows 88 will be force-sized down to pipe 70, which itself may be forcibly expanded, where the three components join, as illustrated, to create an air-tight seal. Welds or brazes may also be provided between the pipe and bellows end and/or between the bellows end and the plate flange. Such methods of joining such components are known to those of ordinary skill in the art.

At the opposite end of bellows 88, bellows end 96 preferably is affixed, on its outer surface, to the inner surface of aperture 98 of plate 90, by a conventional technique such as welding or brazing. The connection between bellows end 96 and plate 90 also must be an air-tight connection. If additional sealing strength is necessary, the face of the corrugation of the bellows nearest end 96 may be affixed, such as by brazing or welding, to the adjacent face of plate 90.

Plate 90 is provided with apertures 100, which are alignable with fastener holes 68 in flange 66. Plate 86 is likewise provided with apertures 102, which are alignable with apertures 100 and fastener holes 68. Bolts 104 preferably are provided with threaded ends 106 and shafts 108. Threaded ends 106 have lesser diameters than their respective shafts 108, to create shoulders 110. In a preferred embodiment, apertures 100 have smooth internal surfaces, and threaded ends 106 are received within internally threaded fastener holes 68. Alternatively, the ends of bolts 104 may be extended, to project beyond the upstream side of flange 66, and fastened by nuts or similar fasteners (not shown). When bolts 104 are affixed in place, shoulders 110 hold plate 90 against flange 66 in a fluid-tight manner. If desired, a suitable sealing gasket (not shown) may be placed between flange 66 and plate 90, to enhance the seal between flange 66 and plate 90. Coil springs 112 are held by bolt heads 114 and/or washers 116, if provided, against the "downstream" side of plate 86.

When assembled, coil springs 112 are preloaded with a load of 50–150 pounds, so that the flexible connector will resist forces which would tend to elongate the connector, and the springs will tend to restore the connector toward its installed configuration. In operation, if forces are exerted on either or both of pipe 70 or manifold 60, which would tend to pivot pipe 70 relative to manifold 60 (see the arrow II, for example), fitting 74 and socket region 62 will permit relative pivoting. Any gases which may pass between fitting 74 and inner surface 84, through such pivoting or in the event of lift-off of fitting 80 from inner surface 84, would become trapped between pipe 70, and plate 90, bellows 88 and plate 86, without any path for escape to the ambient atmosphere, as a result of the sealing connections between the various components. The bellows 88 will accommodate axial elongation and contraction, as well as pivoting movements, while maintaining a sealing enclosure about the pipe 70.

The foregoing embodiment serves to convert an existing manifold structure, configured for a conventional, non-sealing ball joint connector, to a sealed, substantially leak-proof, flexible connector, without requiring substantial modification of the existing manifold structure.

Figure 5:
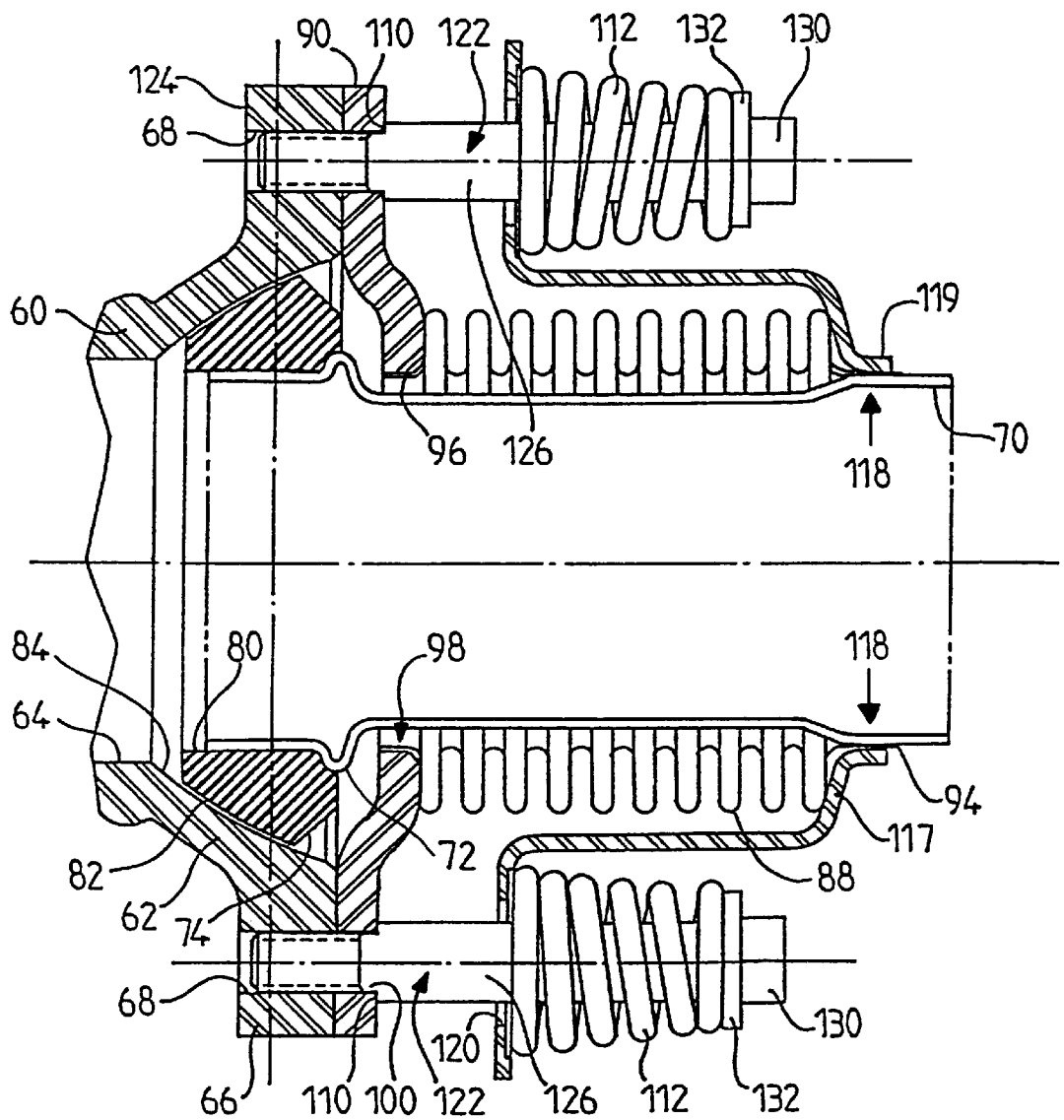
FIG. 5 is a side elevation, in section, of a flexible connector system, according to another embodiment of the present invention.
Figure 7:
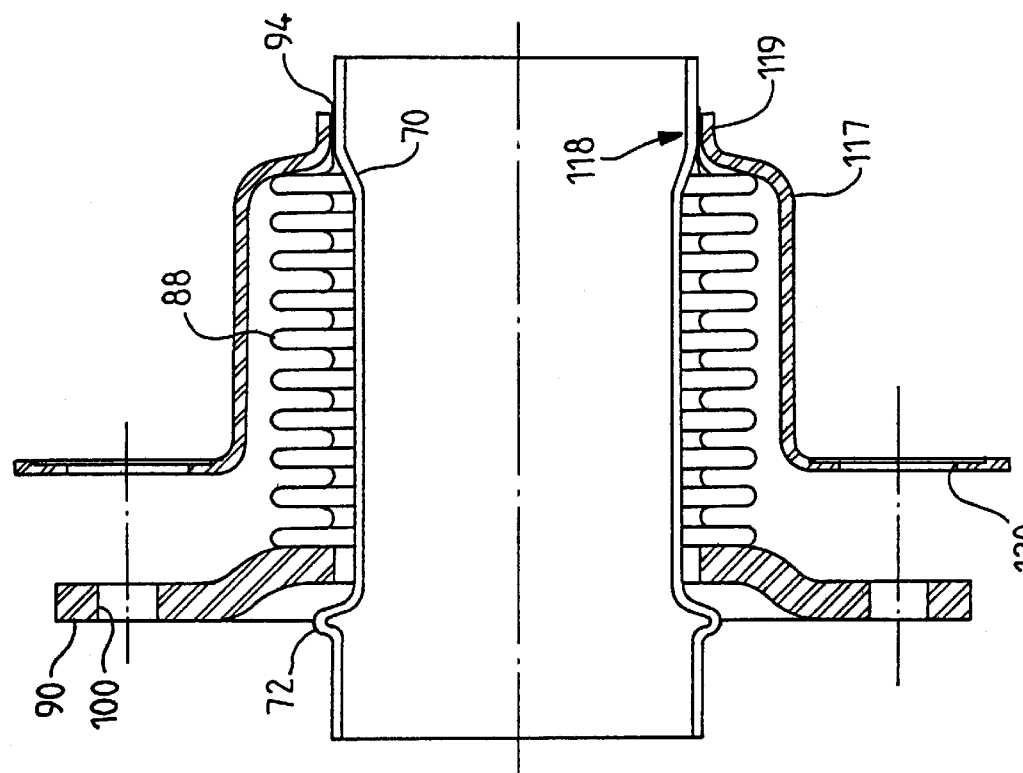
FIG. 7 is a side elevation, in section, of the pipe, plate and bellows components of the flexible connector system of FIG. 5.
Figure 6:
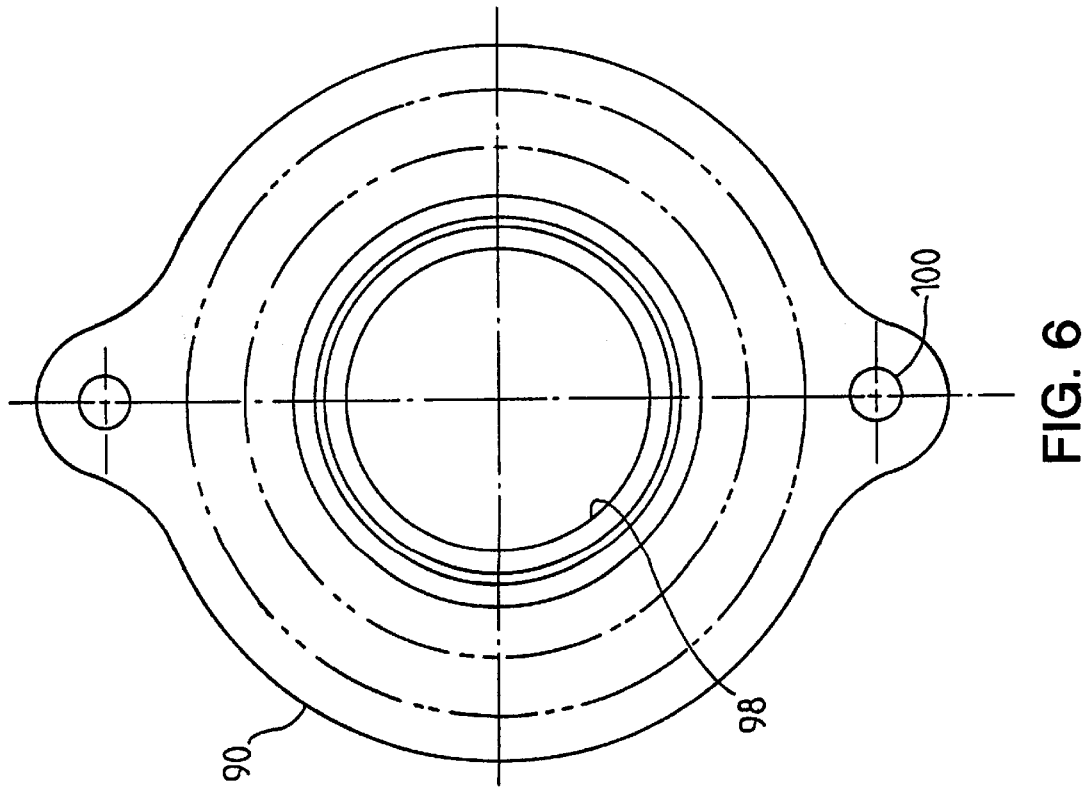
FIG. 6 is an end elevation of a plate used in the flexible connector system of FIG. 5.

FIGS. 5–7 illustrate a variation of the just-described embodiment, which is configured for applications in which a smaller overall flexible connector package size is desired or required. Elements having similar structure and/or operation to similar elements described with respect to FIGS. 2–4 are provided with like reference numerals.

An existing vehicle engine manifold 60 (FIG. 5), has substantially the same configuration as manifold 60 in the embodiment of FIGS. 2–4, and includes socket region 62, aperture 64, flange 66 with fastener holes 68, which typically are spaced apart 180° around aperture 64.

Pipe 70 (which may be a portion of the actual exhaust pipe, or which may be a short pipe section which is, in turn, to be connected downstream to further exhaust pipe members, not shown) includes annular ridge 72. "Upstream" of ridge 72, a fitting 74 is provided which is constructed and received on the end of pipe 70, in a manner substantially the same as in the embodiment of FIGS. 2–4. Fitting 74 also preferably has a bore 80 and an outer surface 82 which generally conforms to the inner surface 84 of socket region 62 of manifold 60.

To the end of pipe 70 is affixed a connector structure including cup 117, bellows member 88 and plate 90. Preferably, cup 117 is provided with a central aperture 118 and a cylindrical flange 119. Bellows 88 is provided with substantially cylindrical ends 94, 96. Plate 90 is provided with a central aperture 98. Bellows end 94 preferably has an inner diameter which is only slightly greater than the outer diameter of pipe 70, but an outer diameter which is only slightly less than the inner diameter of cylindrical flange 119. Preferably, flange 119 of cup 117 and end 94 of bellows 88 will be force-sized down to pipe 70, which itself may be forcibly expanded, where the three components join, as illustrated, to create an air-tight seal. Welds or brazes may also be provided between the pipe and bellows end and/or between the bellows end and the plate flange. Such methods of joining such components are known to those of ordinary skill in the art.

At the opposite end of bellows 88, bellows end 96 preferably is affixed, on its outer surface, to the inner surface of aperture 98 of plate 90, by a conventional technique such as welding or brazing. The connection between bellows end 96 and plate 90 also must be an air-tight connection. If additional sealing strength is necessary, the face of the corrugation of the bellows nearest end 96 may be affixed, such as by brazing or welding, to the adjacent face of plate 90.

Plate 90 is provided with apertures 100, which are alignable with fastener holes 68 in flange 66. Cup 117 is likewise provided with apertures 120, which are alignable with apertures 100 and fastener holes 68. Bolts 122 preferably are provided with threaded ends 124 and shafts 126. Threaded ends 124 have lesser diameters than their respective shafts 126, to create shoulders 110. In a preferred embodiment, apertures 100 have smooth internal surfaces, and threaded ends 124 are received within internally threaded fastener holes 68. Alternatively, the ends of bolts 122 may be extended, to project beyond the upstream side of flange 66, and fastened by nuts or similar fasteners (not shown). When bolts 122 are affixed in place, shoulders 110 hold plate 90 against flange 66 in a fluid-tight manner. If desired, a suitable sealing gasket (not shown) may be placed between flange 66 and plate 90, to enhance the seal between flange 66 and plate 90. Coil springs 112 are held by bolt heads 130 and/or washers 132, if provided, against the "downstream" side of plate 86.

When assembled, coil springs 112 are preloaded with a load of 50–150 pounds, so that the flexible connector will resist forces which would tend to elongate the connector, and the springs will tend to restore the connector toward its installed configuration. In operation, if forces are exerted on either or both of pipe 70 or manifold 60, which would tend to pivot pipe 70 relative to manifold 60 (see the arrow, for example), fitting 74 and socket region 62 will permit relative pivoting. Any gases which may pass between fitting 74 and inner surface 84, through such pivoting or in the event of lift-off of fitting 74 from inner surface 84, would become trapped between pipe 70, plate 90 and, bellows 88 without any path for escape to the ambient atmosphere, as a result of the sealing connections between the various components. The bellows 88 will accommodate axial elongation and contraction, as well as pivoting movements, while maintaining a sealing enclosure about the pipe 70.

The operation of the flexible connector system of FIGS. 5–7 operates in substantially the same manner as the flexible connector system of FIGS. 2–4. But for pipes 70 having the same nominal diameter, the overall length of the flexible connector system of FIGS. 5–7, from the upstream face of plate 90, to the downstream-most ends of cup 117 and/or bolts 122 can be made substantially shorter than the distance from the upstream side of plate 90 to the downstream-most ends of bolts 104, which is advantageous for smaller vehicles, or other instances in which space is crowded. Cup 117 also provides enhanced protection for bellows 88 from debris, rocks, etc. and facilitates handling during assembly.

Figure 8:
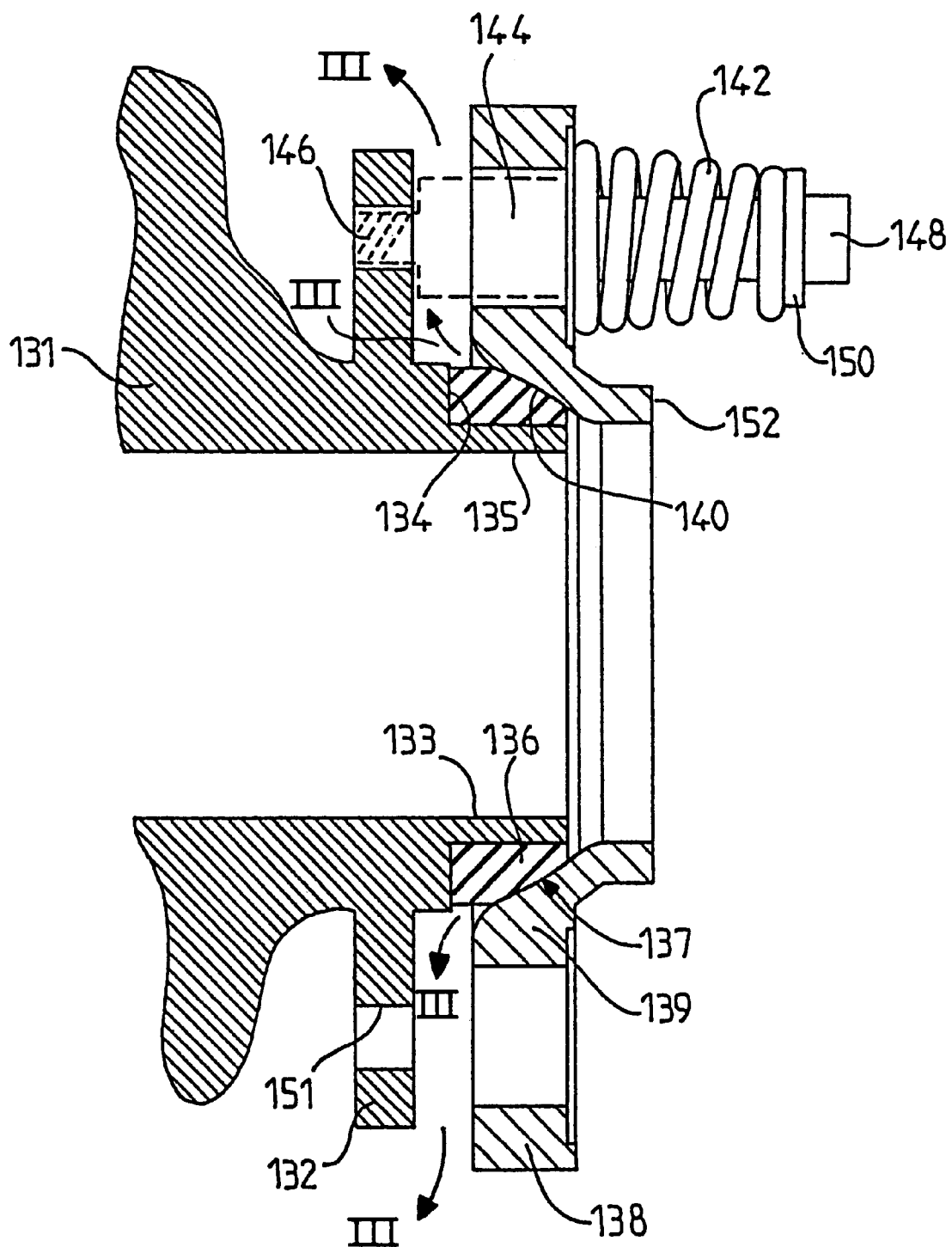
FIG. 8 is a side elevation, in section, of another prior art connector system.

Other prior art connector systems employ a "reverse" ball joint structure, as illustrated in FIG. 8 wherein a portion of a manifold 131 is provided with a flange 132. A projecting collar structure 133 includes a flat annular portion forming a shoulder 134 and a cylindrical portion 135. A fitting 136, which is typically, preferably formed of compressed steel mesh impregnated with vermiculite and graphite, as discussed in the previously-discussed prior art system and two embodiments of the invention, is fitted onto collar structure 133. Fitting 136 will have an outer, three-dimensionally curved surface 137. Plate 138 has a socket region 139 with an inner surface 140 configured to substantially conform with the outer surface 137 of fitting 136. Coil springs 142, held in place by bolts 144, having, typically, threaded ends 146 (engaging a threaded inner surface of fastener holes 151) and heads 148, and washers 150, press plate 138 toward manifold 131, causing inner surface 140 of socket region 139 against fitting 136. Cylindrical portion 152 of plate 138 typically will be attached to an exhaust down pipe by any of a number of conventional methods, such as butt-welding directly to a pipe (not shown), or overlapping with a pipe and welding or brazing.

The interaction of fitting 136 and socket region 139 accommodate pivoting movement. Springs 142 permit axial elongation of the joint, while prompting the plate 138 into contact with fitting 136. However, during pivoting, or when the axial elongation causes lift-off of plate 138 from fitting 136, gases can escape, between fitting 136 and inner surface 140, and then out between flange 136 and plate 138, as indicated by the arrows III.

Figure 9:
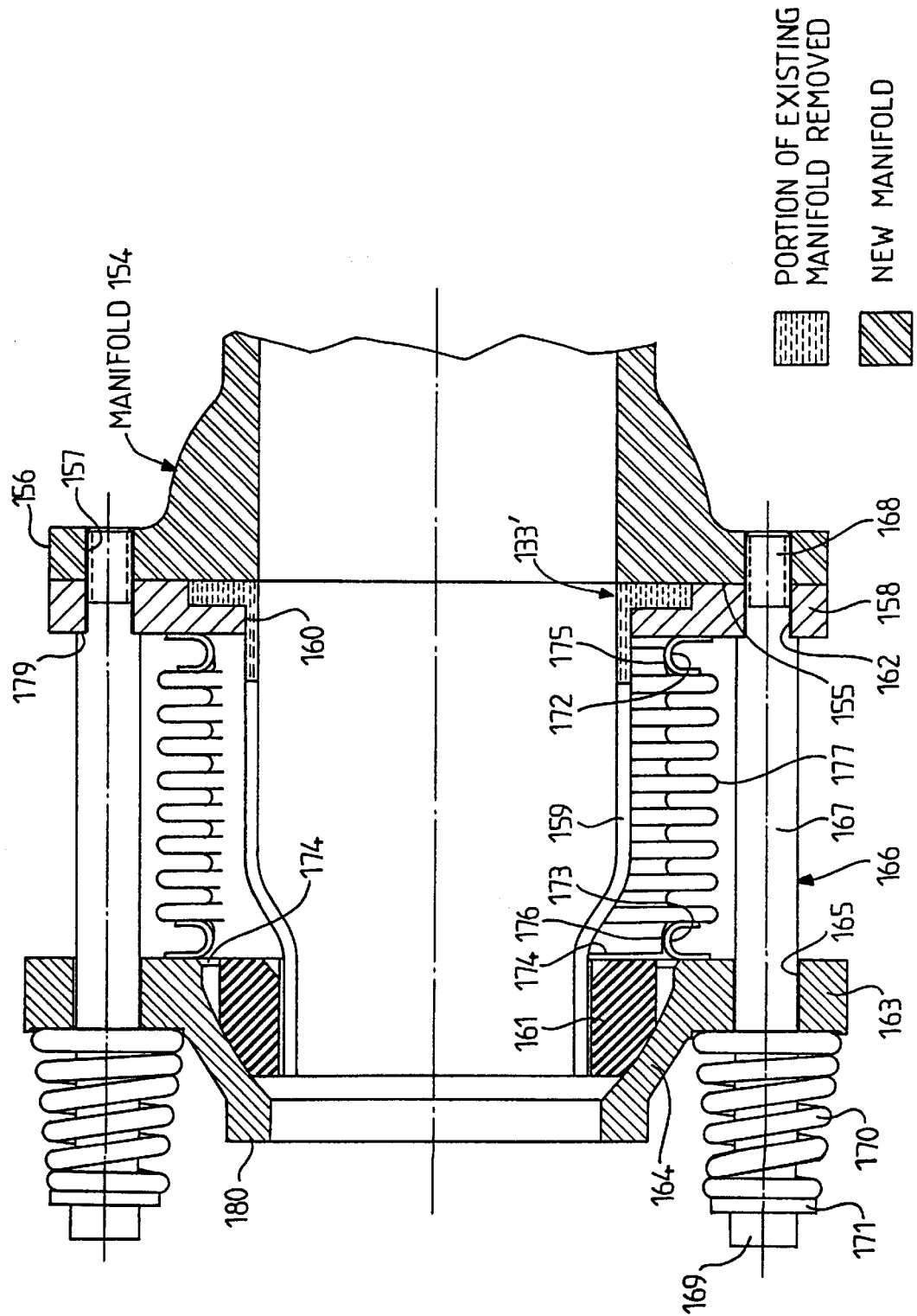
FIG. 9 is a side elevation, in section, of a flexible connector system, according to another embodiment of the present invention, configured for adapting an existing manifold structure using a ball joint type connector system to a sealed flexible connector system.
Figure 10:
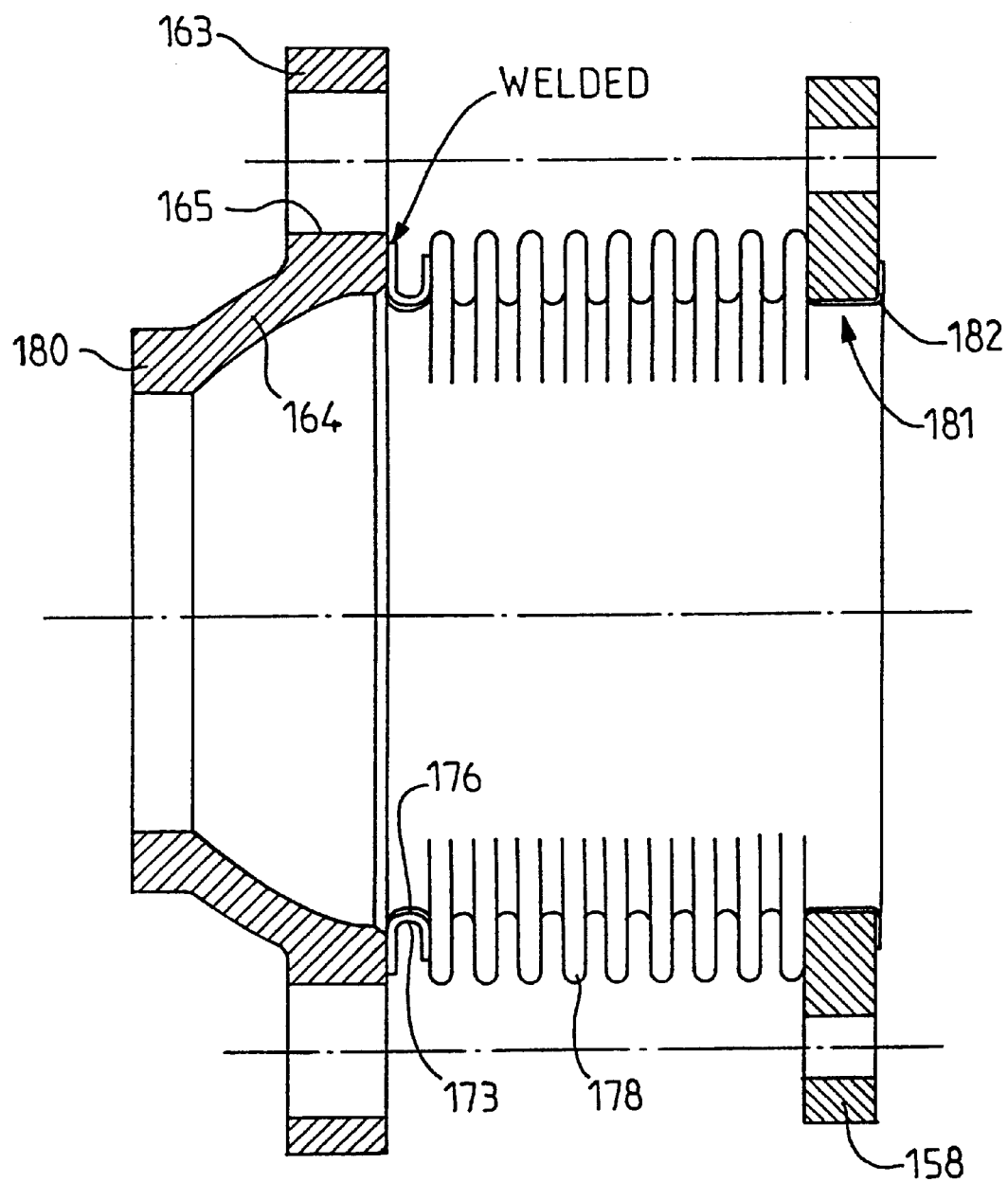
FIG. 10 is a side elevation, in section, of a bellows and plate structure for use with yet another alternative embodiment of the present invention.

In a further embodiment of the present invention, illustrated in FIGS. 9 and 10, the connector system is configured to enable facilitated conversion of a manifold structure as illustrated in FIG. 8, to a sealed, substantially leak-proof flexible connector system.

The conversion of the prior art system of FIG. 8 to one in accordance with the principles of the present invention requires some limited modification, either to the manifolds themselves, once fabricated, typically by casting or stamping, or to the molds or dies for the manifolds. If it is the fabricated manifold that is to be altered, then the collar structure 133 is removed from a manifold 131, as illustrated in FIG. 9, by any suitable method, such as grinding. If it is the mold or die for the manifold, which is to be altered, then those portions of the mold(s) or die(s) which correspond to the collar structure 133 are filled in, using known mold- or diemaking techniques. The result of either procedure would be to generate a "new" manifold 154, which has a completely flat smooth face 155. Manifold 154 would still have a flange 156, with fastener holes 157, as in the previously discussed embodiments.

The flexible connector system of FIG. 9 includes plate 158, pipe section 159, which is rigidly affixed to the central bore 160 of plate 158 by any suitable method, such as welding. Fitting 161 is fitted onto the opposite end of pipe section 159, which has a widening of diameter at a position upstream of fitting 161, for precluding fitting 161 from sliding along the length of pipe section 159. In order to ensure that fitting 161 has only limited movement relative to pipe 159, an annular flange 174 may be affixed to the outside of pipe 159, against which fitting 161 will bear. Plate 158 includes apertures 162, which are alignable with fastener holes 157. Plate 163 is provided with a socket section 164, and apertures 165, which are alignable with apertures 162 and fastener holes 157. Plate 163 is held against fitting 161 by bolts 166, which include shafts 167, narrowed threaded ends 168 and heads 169. Coil springs 170 are held between the downstream face of plate 163 and washers 171 and bolt heads 169. Threaded ends 168 engage threaded inner surfaces of fastener holes 157. Annular members 172 and 173, each of which has a radially outwardly open, substantially U-shaped cross-sectional configuration, are welded to the opposed faces of plates 158 and 163, respectively. The cylindrical ends 175, 176 of bellows 177, are welded, on their outer surfaces, to annular members 172 and 173, respectively.

Shoulders 179 of bolts 166 hold plate 158 against face 155 of manifold 154 to establish a fluid-tight seal. A sealing gasket (not shown) may be positioned between face 155 of manifold 154, and plate 158, for enhancing the seal. The welds between plate 158 and annular member 172, annular member 172 and bellows end 175, bellows end 176 and annular member 173, and annular member 173 and plate 163 are all to be such as to provide fluid-tight seals at each respective location. The downstream end 180 of plate 163 will, in turn, be affixed, by any suitable manner, to a further exhaust down pipe with a fluid-tight connection.

The configuration of the flexible connector system of FIG. 9 is particularly advantageous, in that it provides for the simple and relatively inexpensive conversion of existing non-sealed so-called "reverse" ball joint connectors, into sealed, substantially leak-proof flexible "reverse" ball joint connectors. The conversion is relatively simple in that it involves either the simple removal of material, for example, by grinding, from an existing fabricated manifold, or the filling-in of portions of existing manifold molds or dies to remove projecting features from the finished manifolds, which is readily accomplished and substantially easier and less costly than manufacturing new molds or dies or adding or removing material from the molds or dies to create new projecting features in the finished manifolds.

Alternatively, manifold 154 can be left unmodified, so as to have substantially the same configuration as manifold 131 of FIG. 8. Plate 158 and pipe section 159 can be configured to conform to and fit over existing collar structure 133'. Such a configuration, while possibly being somewhat more expensive to produce, would function in substantially the same manner as the modified manifold construction, and is also within the scope of the present invention.

Figure 11:
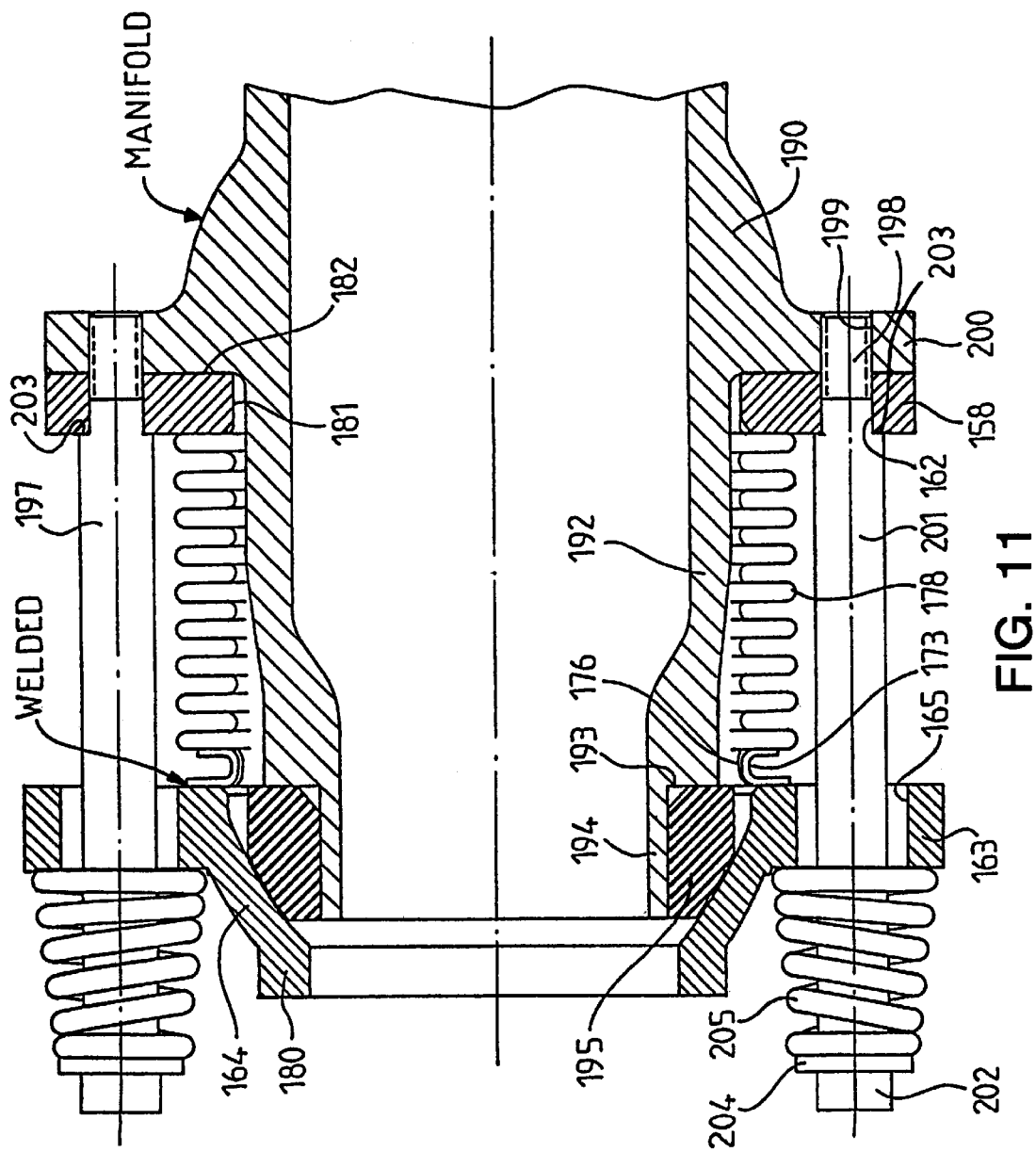
FIG. 11 is a side elevation, in section, of a flexible connector system, according to the embodiment of FIG. 10, configured for a manifold which has been particularly constructed, in accordance with the present invention, for a sealed ball joint type flexible connector system.

FIGS. 10 and 11 illustrate another embodiment of the present invention, which also employs a "reverse" ball joint configuration. FIG. 10 illustrates a plate and bellows structure which is modified to eliminate the annular member 172, which was present in the embodiment of FIG. 9. Instead, the upstream end of bellows 178 is passed through central aperture 181 of plate 158, and turned outwardly to define an annular region having a radially outwardly facing U-shaped cross-section, which is then welded on its radially outwardly facing surfaces to the radially inner surface and adjoining faces of plate 158, as illustrated in FIGS. 10 and 11 at 182. The outward turning enables a seal to be made without the use of a weld. The outward swaging of the bellows end at 182 can also be adapted to others of the embodiments of the present invention. In the embodiment of FIG. 11, manifold 190 is constructed with elongated projecting collar structure 192, with shoulder 193 and cylindrical portion 194. Shoulder 193 and cylindrical portion 194 receive a fitting 195, which is fabricated from powder impregnated metal mesh as in the previous embodiments.

Bolts 197, in particular the threaded narrowed ends 198 thereof, pass through apertures 162 and into threaded fastener holes 199, to hold plate 158 in sealing contact with flange 200 of manifold 190. As in the other embodiments, a sealing gasket (not shown) fabricated from any suitable material, may be disposed between plate 158 and flange 200.

Bolts 197 include shafts 201, heads 202, and shoulders 203, which serve to hold plate 158 against flange 200. Heads 202 and washers 204 force springs 205 against plate 163, to cause plate 163 to bear against fitting 195, in a manner similar to that of the flexible connector system of FIG. 9. Bellows 178 is sealingly welded at its ends, to plate 158, and to annular member 173, respectively, and annular member 173 is sealingly welded to plate 163, to create a complete sealed enclosure of the connection.

Figure 12:
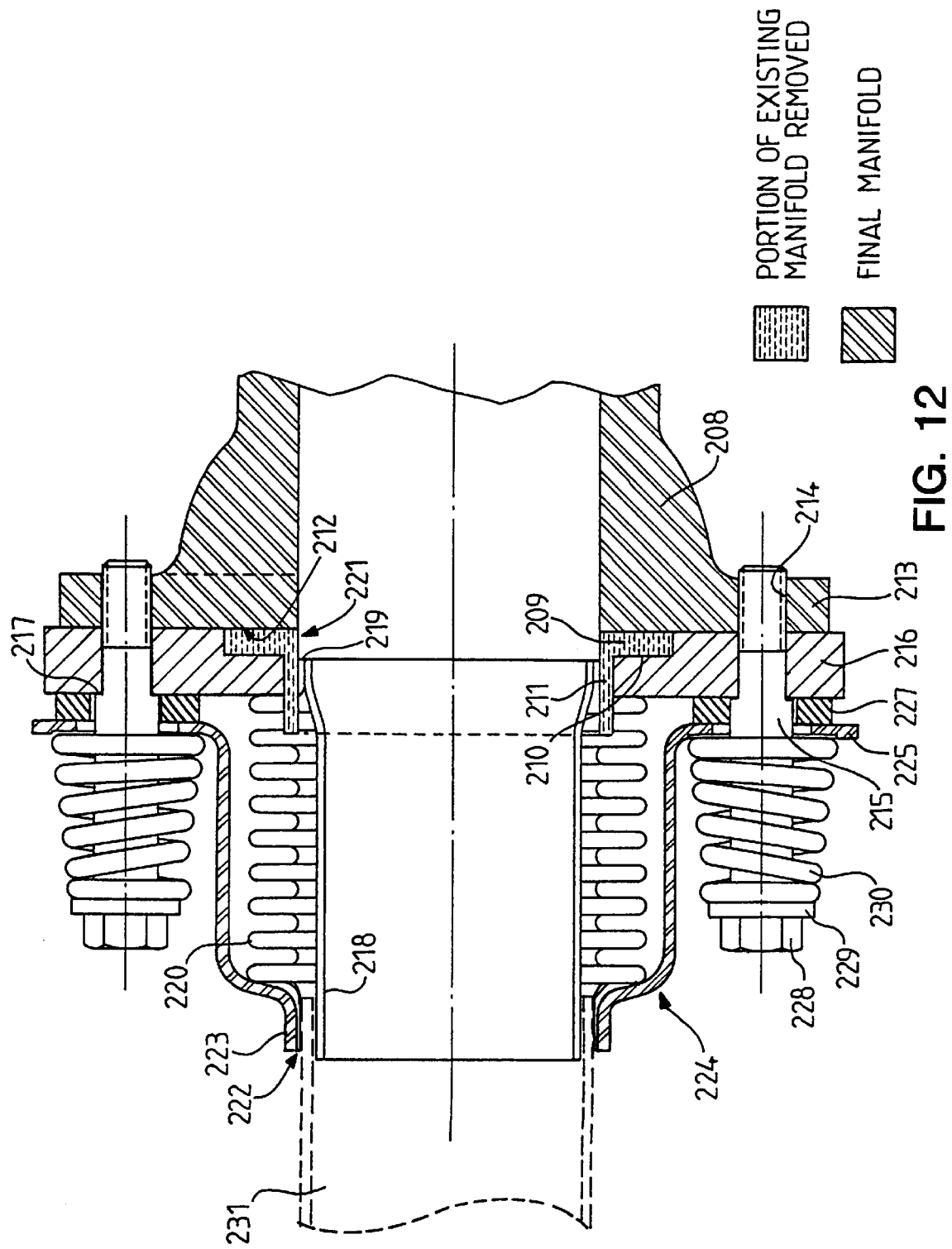
FIG. 12 is a side elevation, in section, of a flexible connector system, according to another embodiment of the present invention, which provides a ball joint type of movement, without requiring a socket region or a specially configured mesh spacer.

FIG. 12 illustrates a further alternative embodiment of the invention, which provides a ball joint type range of movement, but without the need for a socket region or specially shaped wire mesh fittings, as in the prior embodiments of the invention. The flexible connector system embodiment of FIG. 12, like that of FIG. 9, is advantageously configured for use with existing manifold structures and/or molds or dies for same, in which the manifold is original designed to have an outwardly projection collar structure, for receiving a ball joint type metal mesh fitting.

Manifold 208 is an existing manifold structure, having outwardly projecting collar structure 209, which includes annular shoulder 210 and cylindrical portion 211. In accordance with this embodiment of the present invention, collar structure 209 is either removed from the existing manifold, for example, by grinding, or the molds or dies for forming manifold 208 are filled-in, so that the collar structure 209 is not formed, leaving only a flat face 212. Flange 213 includes fastener holes 214, which preferably are internally threaded. Shoulders 217 of bolts 215 hold plate 216 against face 212 of manifold 208. Pipe 218 is affixed at one end to the inner surface of cylindrical end 219 of bellows 220. The outer surface of cylindrical end 219 of bellows 220 is, in turn, affixed, in a fluid-tight manner, to the inner surface of aperture 221 of plate 216. The downstream end of pipe 218 is left free, and end 223 of cup 224 and end 222 of bellows 220 are affixed to an exhaust down pipe (not shown), The downstream cylindrical end 222 of bellows 220 is affixed, to the inner surface of downstream end 223 of cup 224. A fluid-tight seal will be formed such as by welding, between end 222 and the downstream exhaust system component 231. The upstream end of cup 224 ends in a radially outwardly extending flange 225. Between flange 225 and plate 216, an annular metal mesh spacer member 227 is positioned. Spacer member 227 is configured to be somewhat resilient and compressible, under axial compressive loads of 50 to 150 pounds approximately. Spacer member 227 could be replaced by springs such as a coil spring, a Belleville spring, a wave spring, or a similar biased resilient cushion member.

Bolt heads 228 and washers 229, hold springs 230 in place, exerting compressive force against flange 225, in turn causing flange 225 to be compressed against spacer member 227. Spacer member 227 will accommodate axially compressive loads, with resilient compression, tending to reduce or eliminate the propagation of axial vibrations along the exhaust system. In addition, if a bending force is exerted on pipe 218, the compressibility of spacer member 227 will act analogous to a ball joint structure, to yield against and progressively resist, the bending forces. With the sealed connections between the plate, the bellows and the downstream exhaust system component any gases which might pass between the pipe and the bellows would be trapped there, without opportunity for escape to the ambient atmosphere.

Figure 13:
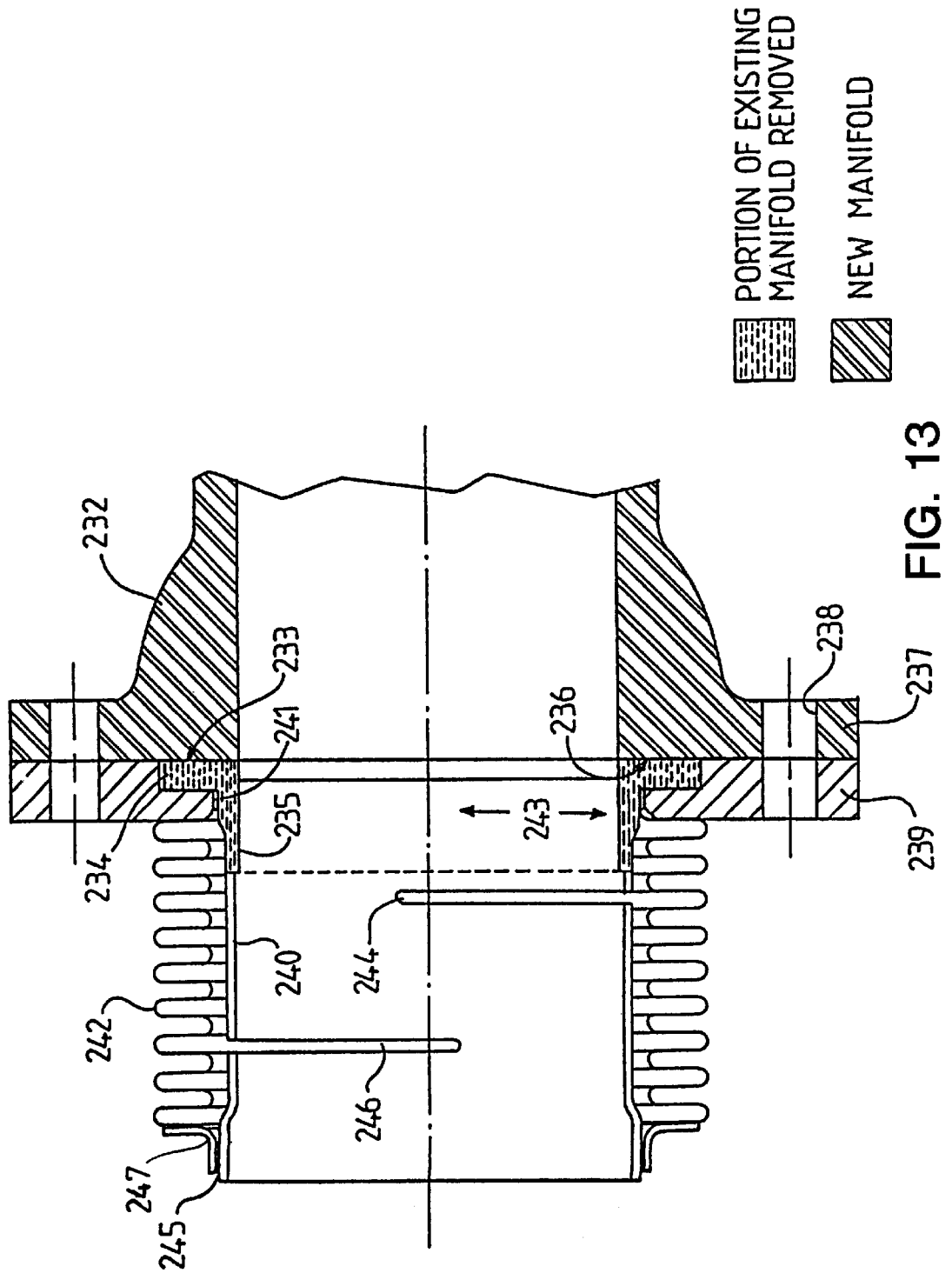
FIG. 13 is a side elevation, in section, of still another embodiment of the invention, wherein a self-supporting flexible connector system is shown.

FIG. 13 illustrates a further embodiment of the invention having a configuration intended to substitute, in part, for the ball and socket structure of a ball joint type of flexible connector system. Again, the flexible connector system embodiment of FIG. 13, like that of FIGS. 9 and 12, is advantageously configured for use with existing manifold structures and/or molds or dies for same, in which the manifold is original designed to have an outwardly projection collar structure, for receiving a ball joint type metal mesh fitting.

Manifold 232 is an existing manifold structure, having outwardly projecting collar structure 233, which includes annular shoulder 234 and cylindrical portion 235. In accordance with this embodiment of the present invention, collar structure 233 is either removed from the existing manifold, for example, by grinding, or the molds or dies for forming manifold 232 are filled-in, so that the collar structure 233 is not formed, leaving only a flat face 236.

Flange 237 includes fastener holes 238, which preferably are internally threaded. Simple bolts (not shown) hold plate 239 against face 236 of manifold 232. A suitable gasket (not shown) may be positioned between plate 239 and manifold 232, if desired, to enhance the fluid-tight seal between plate 239 and manifold 232. Pipe 240 is affixed at one end to the inner surface of cylindrical end 241 of bellows 242. The outer surface of cylindrical end 241 of bellows 242 is, in turn, affixed, in a fluid-tight manner, to the inner surface of aperture 243 of plate 239. The inner surface of the downstream end 245 of bellows 242 is affixed, in a fluid-tight manner, to pipe 240. An annular collar 247, which may have an L-shaped cross-section, may be provided, to reinforce the fluid-tight seal between the bellows 242 and pipe 240. The downstream end of pipe 240 is, in the usual manner, affixed to a further exhaust down pipe.

Instead of using a ball joint structure, or even the resilient annular metal mesh ring of FIG. 12, pipe 240 (FIG. 13) is provided with cuts 244, 246, etc., each of which preferably extends in an arc of 90° to 300° around the circumference of pipe 240. Each successive cut should be rotated about the circumference of the pipe 300° to 180° relative to the cuts preceding it and following it. The cuts should be spaced at least 0.25 inch up to 2 inches apart. Each cut should have a length of 0.060 to 1.0 inches, for a pipe 240 having a nominal width of 1–4 inches. Cuts 244, 246, etc. provide a limited amount of flexibility to pipe 240, by slightly reducing the resistance of the pipe to bending, while still providing a pipe which is capable of supporting itself, in most usual exhaust system applications. While the embodiment of FIG. 13 is less able, by itself, to accommodate axial elongations or contractions, such stresses can be accommodated immediately downstream of the flexible connector system of FIG. 13, by otherwise conventional structures.

The flexible connector system of FIG. 13 is advantageous in that it is substantially self-supporting, as that term is understood in the art, relative to the other embodiments which have already been described, as well as relative to the prior art, while providing a level of pivoting flexibility which is comparable to a ball joint type connector system, and while providing sealed, substantially leakproof decoupling of lateral vibrations.

The embodiments of FIGS. 12 and 13 can also be provided, using an unmodified manifold structure, by adapting the cross-sectional configuration and connections between the plate 216 and pipe 218, or between plate 239 and pipe 240, by one having ordinary skill in the art having the present disclosure before them. Accordingly, such "unmodified" configurations likewise are contemplated as being within the scope of the present invention.

Although the apparatus of FIGS. 2–7 and 9–12 are described in combination with exhaust manifolds, it is understood that other "upstream" and "downstream" components could be connected, such as two pipes, a pipe and a catalytic converter, etc. without substantial modification.

Figure 14:
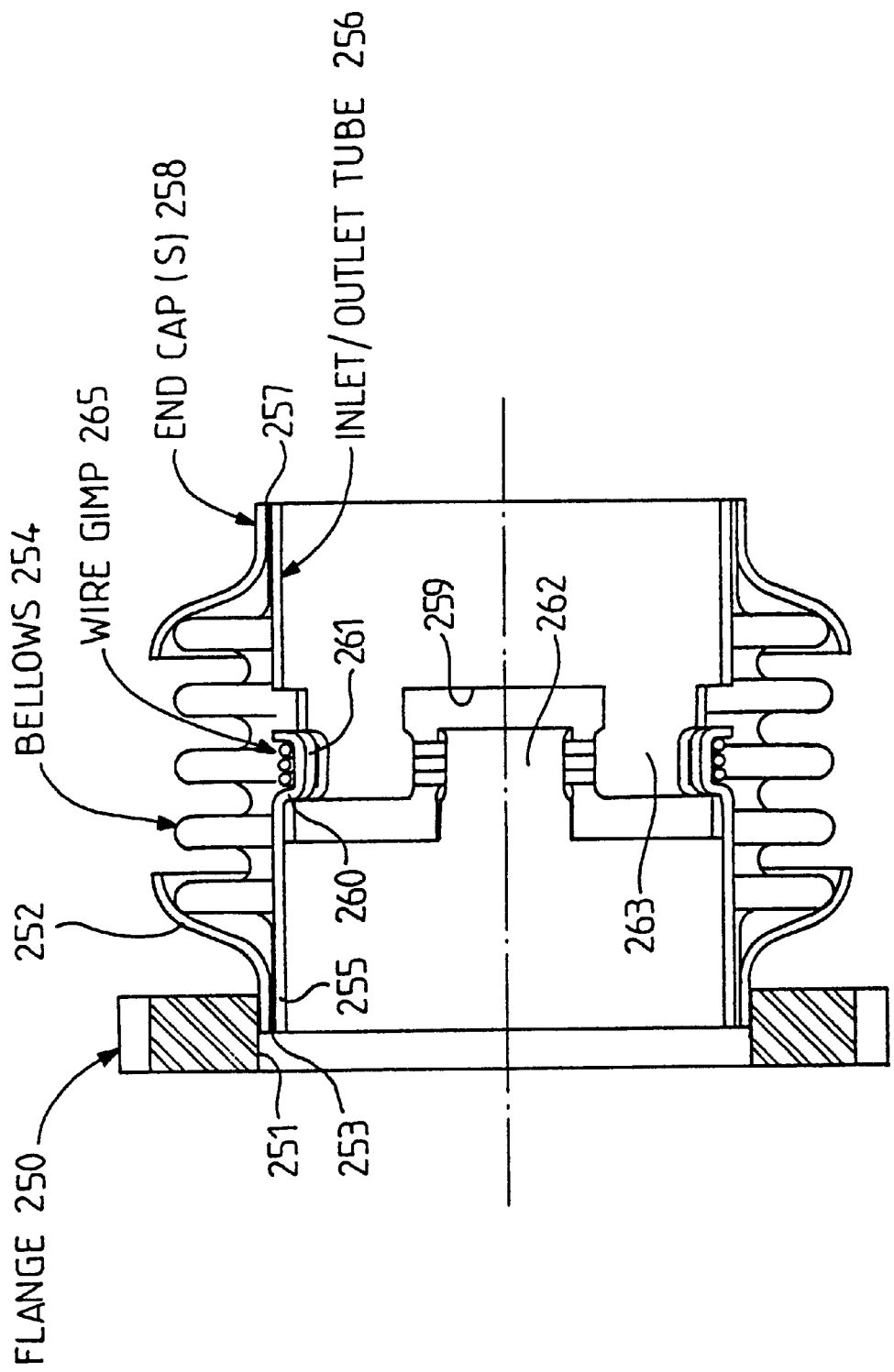
FIG. 14 is a side elevation, in section of a further embodiment of the present invention.

FIG. 14 illustrates a further embodiment of the present invention, in which a flange 250 may be a portion of a manifold or other structure. The inner surface of aperture 251 of flange 250 surrounds and is preferably sealingly affixed to an outer surface of end cap 252 or to the adjacent exhaust component. The inner surface of end cap 252 in turn surrounds and is preferably sealingly affixed to cylindrical end 253 of bellows 254. Cylindrical end 253 of bellows 254 in turn surrounds and is preferably sealingly affixed to an end of inlet/outlet tube 255. The respective inlet outlet tube 256, cylindrical end 257 of bellows 254 and end cap 258 are similarly sealingly affixed to one another. Tubes 255 and 256, at their facing ends, are cut with alternating notches, such as notch 259, to define prongs 262, 263, etc., which emanating in an alternating manner from tubes 255 and 256. In the embodiment shown in FIG. 14, tubes 255 and 256 each have four prongs formed in their adjoining ends, although more or fewer prongs could be used. Wire gimp 265 attaches tube 255 to tube 256. Depending upon how tightly gimp 265 is wound and the amount of overlap in the tabs, the amount of axial movement can be varied. Also other structures, like a mesh ring, could be used instead of a wire gimp.

It can be readily understood that the flexible coupler apparatus of the embodiments of FIGS. 13 and 14 can be used in locations other than at an exhaust manifold port, without departing from the scope of the invention. For example, the structures of FIGS. 13 or 14 could be used, without substantial modification, to connect two abutting pipe ends.

The foregoing description and drawings merely explain and illustrate the invention and the invention is not limited thereto except insofar as the appended claims are so limited, as those skilled in the art who have the disclosure before them will be able to make modifications and variations therein without departing from the scope of the invention.

We claim:

1. A flexible connector system in combination with an exhaust manifold for an internal combustion engine, comprising:

an engine manifold, having at least one outlet aperture, and a component connection structure;

a downstream exhaust system component;

a flexible connector connecting the exhaust manifold with the downstream exhaust system component, said flexible connector including an intermediate pipe member, having a first end and a second end, the intermediate pipe member being operably configured for attachment, at one of the first and second ends, to the downstream exhaust system component, the intermediate pipe member further being configured to be alignable with and positionable substantially adjacent to the at least one outlet aperture of the exhaust manifold at the other of the first and second ends, for the transportation of fluid from the at least one outlet aperture to the downstream exhaust system component;

a flexible tubular bellows member, having a first end and a second end, disposed about the intermediate pipe member and affixable, at least indirectly, at said one of its first and second ends, to the downstream exhaust system component, with a substantially leakproof fluid-tight seal;

a first interface member, operably configured for engagement with a portion of the component connection structure of the exhaust manifold, and connected with a substantially leakproof fluid-tight seal between the first interface member and the portion of the component connection structure of the exhaust manifold, and connected with a substantially leakproof fluid-tight seal between the first interface member and the other of the first and second ends of the bellows member;

a second interface member, operably connected, at least indirectly, to both the intermediate pipe member and the flexible tubular bellows member, proximate to said one of its first and second ends, for placing a preloaded biasing force on the flexible connector system;

at least one engagement member, configured for operable association between the intermediate pipe member, and at least one of said second interface member and the exhaust manifold, for accommodating both relative pivoting and lateral movement between at least one of the intermediate pipe member and the second interface member; and at least one of the exhaust manifold and the first interface member, respectively; and at least one resilient preloading member, in addition to both the tubular bellows member and the at least one engagement member.

said at least one resilient preloading member being operably configured for maintaining the at least one engagement member in biased prompted engagement with at least one of the component connection structure of the exhaust manifold, the first interface member, and the second interface member.

2. The flexible connector system according to claim 1, wherein the component connection structure of the exhaust manifold includes a substantially flat attachment surface, which has been formed by removing from an existing exhaust manifold structure, outwardly projecting structures from the exhaust manifold.

3. The flexible connector system according to claim 1, wherein the component connection structure of the exhaust manifold includes a substantially flat attachment surface, which has been formed by filling the corresponding portions of the existing form for fabricating the exhaust manifold, from which any outwardly projecting structures which would otherwise project from the attachment surface, are produced, to preclude formation of such projecting structures, upon the initial fabrication of the exhaust manifold.

4. A flexible connector apparatus for joining an exhaust manifold, having at least one outlet aperture, and a component connection structure, to a downstream exhaust system component, for providing a substantially sealed, leakproof connection for substantially precluding the escape into ambient atmosphere of exhaust gases while accommodating laterally directed and bending forces acting upon the joined components, towards substantially precluding the transmission from one component to another of such laterally directed and bending forces, the flexible connector apparatus comprising:

an intermediate pipe member, having a first end and a second end, the intermediate pipe member being operably configured for attachment, at one of the first and second ends, to a downstream exhaust system component, the intermediate pipe member further being configured to be alignable with and positionable substantially adjacent to an at least one outlet aperture of an exhaust manifold at the other of the first and second ends, for the transportation of fluid from the at least one outlet aperture to a downstream exhaust system component;

a flexible tubular bellows member, having a first end and a second end, disposed about the intermediate pipe member and sealingly affixed, at least indirectly, at said one of the first and second ends, to a downstream exhaust system component, with a substantially leakproof fluid-tight seal;

a first interface member, operably configured for engagement with a portion of the component connection structure of an exhaust manifold, for establishing a substantially leakproof fluid-tight seal between the first interface member and the portion of the component connection structure of an exhaust manifold, and for establishing a substantially leakproof fluid-tight seal between the first interface member and the other of the first and second ends of the bellows member;

a second interface member, operably connected, at least indirectly, to both the intermediate pipe member and the flexible tubular bellows member, proximate to said one of its first and second ends, for placing a preloaded biasing force on the flexible connector system;

at least one engagement member, configured for operable association with the intermediate pipe member, and at least one of said second interface member, and an exhaust manifold, for accommodating both relative pivoting and lateral movement between at least one of the intermediate pipe member and the second interface member; and at least one of the exhaust manifold and the first interface member, respectively;

at least one resilient preloading member, in addition to both the tubular bellows member and the at least one engagement member, said at least one resilient preloading member being operably configured for maintaining the at least one engagement member in biased prompted engagement with one of the component connection structure of the exhaust manifold, the first interface member, and the second interface member.

5. The flexible connector apparatus according to claim 4 wherein the engagement member comprises:

a fitting member, operably disposed on one end of the intermediate pipe member, and operably configured to substantially conform to and mate with a socket region operably disposed in one of a component connection structure of an exhaust manifold and the second interface member operably associated with the flexible tubular bellows member, for enabling substantially omni-directional pivoting of the intermediate pipe member relative to one of the exhaust pipe manifold and the second interface member.

6. The flexible connector apparatus according to claim 5 wherein the fitting member comprises:

an annular ring member fabricated from metal mesh material, and having a three-dimensionally curved outer surface.

7. The flexible connector apparatus according to claim 6, wherein the fitting member further comprises:

an anti-friction powder material, impregnated into the interstices of the annular ring member.

8. The flexible connector apparatus according to claim 5 wherein the second interface member comprises:

a plate member, operably configured to be affixed, in a sealing, fluid-tight manner, to a downstream component, the plate member being further operably configured to be affixed to another of the first and second ends of the flexible tubular bellows member.

9. The flexible connector apparatus according to claim 8, wherein the plate member is substantially planar in configuration.

10. The flexible connector apparatus according to claims 8, wherein the plate member is substantially cup-shaped in configuration.

11. The flexible connector apparatus according to claim 8, and configured for cooperation with a exhaust manifold having a component connection structure having a socket region therewithin, wherein the fitting member is operably disposed at the end of the intermediate pipe, opposite the end thereof whereat the bellows member is at least indirectly affixed.

12. The flexible connector apparatus according to claim 11, wherein the intermediate pipe member is formed as a contiguous part of the component connection structure of the exhaust manifold, such that the fitting member is received on a projecting end of the component connection structure, and wherein the second interface member has a socket region therewithin;

the end of the bellows member which is at least indirectly affixable to a downstream exhaust system component being directly affixed, in a sealing, leakproof manner, to the second interface member, which is, in turn, substantially directly affixable to a downstream exhaust system component.

13. The flexible connector apparatus according to claim 12, wherein a socket region is disposed within the second interface member, for cooperative engagement with the fitting member.

14. The flexible connector apparatus according to claim 12, wherein the bellows member is affixed at its ends in a sealing, fluid-tight manner, to the first and second interface members.

15. The flexible connector apparatus according to claim 8, wherein the intermediate pipe member is at least indirectly affixable at one end to the component connection structure of an exhaust manifold, such that the fitting member is received on an end of the intermediate pipe member, opposite to the end which is at least indirectly affixable to the exhaust manifold, and wherein the second interface member has a socket region therewithin;

the end of the bellows member which is at least indirectly affixable to a downstream exhaust system component being directly affixed, in a sealing, leakproof manner, to the second interface member, which is, in turn, substantially directly affixable to a downstream exhaust system component.

16. The flexible connector apparatus according to claim 15, wherein a socket region is disposed within the second interface member, for cooperative engagement with the fitting member.

17. The flexible connector apparatus according to claim 15, wherein the bellows member is affixed at its ends in a sealing, fluid-tight manner, to the first and second interface members.

18. The flexible connector apparatus according to claim 5, wherein the at least one preloading member comprises:

at least one fastener member, operably configured for affixing the first interface member to a component connection structure of an exhaust manifold;

at least one biasing member, operably associated with the at least one fastener member and the second interface member, for prompting the second interface member axially toward the first interface member.

19. The flexible connector apparatus according to claim 4, further comprising a second interface member, configured for operable association with an end of the bellows member opposite the end which is sealed to the first interface member.

20. The flexible connector apparatus according to claim 19, wherein the second interface member is further operably associated with the first interface member, for angular movement relative thereto.

21. The flexible connector apparatus according to claim 20, wherein the engagement member comprises a resilient spacer member axially disposed between the first and second interface members and in abutting contact therewith.

22. The flexible connector apparatus according to claim 21, wherein the spacer member comprises a metal mesh ring.

23. The flexible connector apparatus according to claim 21, wherein the at least one preloading member comprises:

at least one fastener member, operably configured for affixing the first interface member to a component connection structure of an exhaust manifold;

at least one biasing member, operably associated with the at least one fastener member and the second interface member, for prompting the second interface member axially toward the first interface member, and compressing the spacer member therebetween.

24. A flexible connector apparatus for joining an exhaust manifold, having at least one outlet aperture, and a component connection structure, to a downstream exhaust system component, for providing a substantially sealed, leakproof connection for substantially precluding the escape into ambient atmosphere of exhaust gases while accommodating laterally directed and bending forces acting upon the joined components, towards substantially precluding the transmission from one component to another of such laterally directed and bending forces, the flexible connector apparatus comprising:

an intermediate pipe member, having a first end and a second end, the intermediate pipe member being operably configured for attachment, at one of the first and second ends, to a downstream exhaust system component, the intermediate pipe member further being configured to be alignable with and positionable substantially adjacent to an at least one outlet aperture of an exhaust manifold, at the other of the first and second ends, for the transportation of fluid from the at least one outlet aperture to a downstream exhaust system component;

a flexible tubular bellows member, having a first end and a second end, disposed about the intermediate pipe member and affixable, at least indirectly, at said one of the first and second ends, to a downstream exhaust system component, with a substantially leakproof fluid-tight seal;

a first interface member, operably configured for engagement with a portion of the component connection structure of an exhaust manifold, for establishing a substantially leakproof fluid-tight seal between the first interface member and the portion of the component connection structure of an exhaust manifold, and for establishing a substantially leakproof fluid-tight seal between the first interface member and the other of the first and second ends of the bellows member;

at least one engagement member, configured for operable association with the intermediate pipe member, for accommodating both angular and lateral movement between the intermediate pipe member and an exhaust manifold;

the at least one engagement member in turn comprising:

a region of the intermediate pipe member, apart from the flexible tubular bellows member, operably configured, by having at least one region of cut through the entirety of at least a section of said intermediate pipe member, for enabling enhanced flexibility of the intermediate pipe member, toward accommodating relative angular movement between an exhaust manifold and other regions of the intermediate pipe member.

25. The flexible connector apparatus according to claim 24, wherein the region of the intermediate pipe member which is operably configured for enabling enhanced flexibility comprises:

a region wherein portions of pipe material have been removed, in arcuate segments along a circumferential direction relative to a longitudinal axis of the intermediate pipe member.

26. The flexible connector apparatus according to claim 25, wherein the region of the intermediate pipe member which is operably configured for enabling enhanced flexibility comprises:

a region wherein portions of pipe material have been removed, forming first and second intermediate pipe members, having alternating interlaced axially overlapping tab members emanating therefrom; and at least one binding member, operably encircling the alternating interlaced axially overlapping tab members for flexibly binding the first and second intermediate pipe members to one another.

27. A method for providing a flexible connector for an exhaust manifold, having at least one outlet aperture, and a component connection structure, to a downstream exhaust system component, for providing a substantially sealed, leakproof connection for substantially precluding the escape into ambient atmosphere of exhaust gases while accommodating laterally directed and bending forces acting upon the joined components, towards substantially precluding the transmission from one component to another of such laterally directed and bending forces, the method for providing a flexible connector comprising:

forming an intermediate pipe member, having a first end and a second end, configuring the intermediate pipe member for attachment, at one of the first and second ends, to a downstream exhaust system component, further configuring the intermediate pipe member to be alignable with and positionable substantially adjacent to an at least one outlet aperture of an exhaust manifold, at the other of the first and second ends, for the transportation of fluid from the at least one outlet aperture to a downstream exhaust system component;

forming a flexible tubular bellows member, having a first end and a second end, and disposing the bellows member about the intermediate pipe member and affixable, at least indirectly, at one of the first and second ends, to a downstream exhaust system component, with a substantially leakproof fluid-tight seal;

providing a first interface member, operably configured for engagement with a portion of the component connection structure of an exhaust manifold, for establishing a substantially leakproof fluid-tight seal between the first interface member and the portion of the component connection structure of an exhaust manifold, and for establishing a substantially leakproof fluid-tight seal between the first interface member and the other of the first and second ends of the bellows member;

providing a second interface member, and operably connecting same, at least indirectly, to both the intermediate pipe member and the flexible tubular bellows member;

providing at least one engagement member, configured for operable association with the intermediate pipe member, and at least one of said second interface member, and an exhaust manifold, for accommodating both relative pivoting and lateral movement between at least one of the intermediate pipe member and the second interface member; and at least one of the exhaust manifold and the first interface member, respectively.

28. The method for providing a flexible connector according to claim 27, further comprising:

providing at least one resilient preloading member, said at least one resilient preloading member being operably configured for maintaining the at least one engagement member in biased prompted engagement with at least one of the component connection structure of an exhaust manifold, the first interface member, the second interface member.

29. The method for providing a flexible connector according to claim 28 further comprising:
  providing a component connection structure on a exhaust manifold, having a substantially planar engagement surface by performing one of the following steps:
    removing any projecting component connection structures, if present, from the exhaust manifold and precluding formation of any projecting component connection structures on said exhaust manifold.

30. The method for providing a flexible connector according to claim 29 wherein the step of precluding formation of any projecting component connection structures on the exhaust manifold further comprises the step of filling in portions of a mold or die for a exhaust manifold corresponding to projecting component connection structures.

31. A method for converting an exhaust system for an internal combustion engine, which exhaust system includes an exhaust manifold configured for use with a non-sealed connector for coupling the exhaust manifold to a downstream exhaust system component, to a sealed, flexible exhaust system, the method comprising the steps of:
  providing a component connection structure on an exhaust manifold, having a substantially planar engagement surface by performing the following steps:
    removing projecting component connection structures from the exhaust manifold;
    affixing a flexible connector apparatus to the exhaust manifold in a sealed, flexible connection thereto,
    the flexible connector apparatus including a tubular bellows member, operably disposed for substantially precluding escape of exhaust gases from the flexible connector apparatus.

32. The method according to claim 31, wherein the step of precluding formation of any projecting component connection structures on the exhaust manifold further comprises the step of filling in portions of a mold or die for a exhaust manifold corresponding to projecting component connection structures.

33. A method for converting an exhaust system for an internal combustion engine, which exhaust system includes an exhaust manifold configured for use with a non-sealed connector for coupling the exhaust manifold to a downstream exhaust system component, to a sealed, flexible exhaust system, the method comprising the steps of:
  providing a component connection structure on an exhaust manifold, having a substantially planar engagement surface by performing the following steps:
    precluding formation of projecting component connection structures on the exhaust manifold;
    affixing a flexible connector apparatus to the exhaust manifold in a sealed, flexible connection thereto,
    the flexible connector apparatus including a tubular bellows member, operably disposed for substantially precluding escape of exhaust gases from the flexible connector apparatus.

34. A method for converting an exhaust system for an internal combustion engine, which exhaust system includes an exhaust manifold configured for use with a non-sealed connector for coupling the exhaust manifold to a downstream exhaust system component, to a sealed, flexible exhaust system, the method comprising the steps of:
  providing a component connection structure on an exhaust manifold, having a substantially planar engagement surface by performing the following steps:
    bypassing projecting component connection structures on the exhaust manifold;
    affixing a flexible connector apparatus to the exhaust manifold in a sealed, flexible connection thereto,
    the flexible connector apparatus including a tubular bellows member, operably disposed for substantially precluding escape of exhaust gases from the flexible connector apparatus.

35. A method for converting an exhaust system for an internal combustion engine, which exhaust system includes an exhaust manifold configured for use with a non-sealed connector for coupling the exhaust manifold to a downstream exhaust system component, to a sealed, flexible exhaust system, the method comprising the steps of:
  providing a component connection structure on an exhaust manifold, having a substantially planar engagement surface by performing the following steps:
    integrating existing projecting component connection structures from the exhaust manifold;
    affixing a flexible connector apparatus to the exhaust manifold in a sealed, flexible connection thereto,
    the flexible connector apparatus including a tubular bellows member, operably disposed for substantially precluding escape of exhaust gases from the flexible connector apparatus.

* * * * *

UNITED STATES PATENT AND TRADEMARK OFFICE
CERTIFICATE OF CORRECTION

PATENT NO.     : 5,944,363                                            Page 1 of 1
DATED          : August 31, 1999
INVENTOR(S)    : Scott Cwik, Roy S. Clavey and Matthew T. O'Sullivan It is certified that error appears in the above-identified patent and that said Letters Patent is hereby corrected as shown below:

Column 3,
Line 31, after "manifold" delete "." and insert instead -- for --

Signed and Sealed this

Fifth Day of August, 2003

JAMES E. ROGAN
*Director of the United States Patent and Trademark Office*